(12) United States Patent
Kilibarda et al.

(10) Patent No.: US 8,261,960 B2
(45) Date of Patent: Sep. 11, 2012

(54) SINGLE RETAINER MOUNTED RISER

(75) Inventors: Velibor Kilibarda, West Bloomfield, MI (US); Michael R. Dugas, Brighton, MI (US); William T. Maybee, Southfield, MI (US); Hans Nikesch, New Baltimore, MI (US)

(73) Assignee: Comau, Inc., Southfield, MI (US)

( * ) Notice: Subject to any disclaimer, the term of this patent is extended or adjusted under 35 U.S.C. 154(b) by 0 days.

(21) Appl. No.: 13/286,277

(22) Filed: Nov. 1, 2011

(65) Prior Publication Data

US 2012/0066885 A1  Mar. 22, 2012

Related U.S. Application Data

(60) Division of application No. 12/819,435, filed on Jun. 21, 2010, now Pat. No. 8,070,040, which is a division of application No. 11/768,482, filed on Jun. 26, 2007, now Pat. No. 7,784,665, which is a continuation-in-part of application No. 11/451,522, filed on Jun. 12, 2006, now Pat. No. 7,271,367.

(51) Int. Cl.
   *B23K 37/00* (2006.01)

(52) U.S. Cl. ........................................ 228/44.3; 248/548

(58) Field of Classification Search ................. 228/44.3; 248/548

See application file for complete search history.

(56) References Cited

U.S. PATENT DOCUMENTS

| | | | |
|---|---|---|---|
| 3,595,105 A | 7/1971 | Wagner | |
| 4,162,387 A | 7/1979 | De Candia | |
| 4,442,335 A | 4/1984 | Rossi | |
| 4,535,927 A | 8/1985 | Matsubara et al. | |
| 4,606,488 A | 8/1986 | Yanagisawa | |
| 4,629,109 A | 12/1986 | Matsushita | |
| 4,846,469 A | 7/1989 | Nye | |
| 4,972,987 A | 11/1990 | Di Rosa | |
| 5,174,488 A | 12/1992 | Alborante | |
| 5,185,595 A * | 2/1993 | Friesen | 340/690 |
| 5,265,317 A | 11/1993 | Angel | |
| 5,267,683 A | 12/1993 | Hamada et al. | |
| 5,374,799 A | 12/1994 | Nishimoto et al. | |
| 5,400,943 A | 3/1995 | Rossi | |
| 5,400,944 A | 3/1995 | Zimmer et al. | |
| 5,427,300 A | 6/1995 | Quagline | |
| 5,548,096 A | 8/1996 | Akasaka et al. | |
| RE36,541 E | 2/2000 | Rossi | |
| 6,080,071 A | 6/2000 | Childers et al. | |
| 6,173,881 B1 | 1/2001 | Sloan et al. | |
| 6,344,629 B1 | 2/2002 | Kato et al. | |
| 6,467,675 B1 | 10/2002 | Ozaku et al. | |
| 6,691,392 B2 | 2/2004 | Savoy et al. | |
| 6,835,909 B2 | 12/2004 | Nakamura et al. | |
| 6,908,024 B2 | 6/2005 | Martin et al. | |
| 6,966,421 B2 | 11/2005 | Nakamura | |
| 7,271,367 B2 | 9/2007 | Kilibarda et al. | |
| 7,784,665 B2 | 8/2010 | Kilibarda et al. | |
| 2005/0035175 A1 | 2/2005 | Nakamura et al. | |
| 2006/0289414 A1 | 12/2006 | Kilibarda et al. | |

FOREIGN PATENT DOCUMENTS

JP          11-179557          7/1999

\* cited by examiner

*Primary Examiner* — Nicholas D'Aniello

(74) *Attorney, Agent, or Firm* — Young Basile

(57) ABSTRACT

A fastening device and method for mounting equipment to a framing member. The invention includes a single breakaway fastener that is pretentioned using a biasing member to fracture on a predetermined force applied to the fastened joint to avoid damage to the secured equipment. In one example the device and method includes the fastener having a reduced diameter portion that is positioned between an annular plate and the framing member.

10 Claims, 19 Drawing Sheets

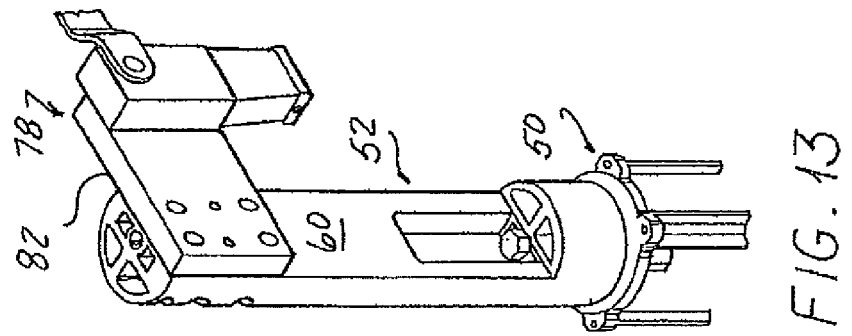
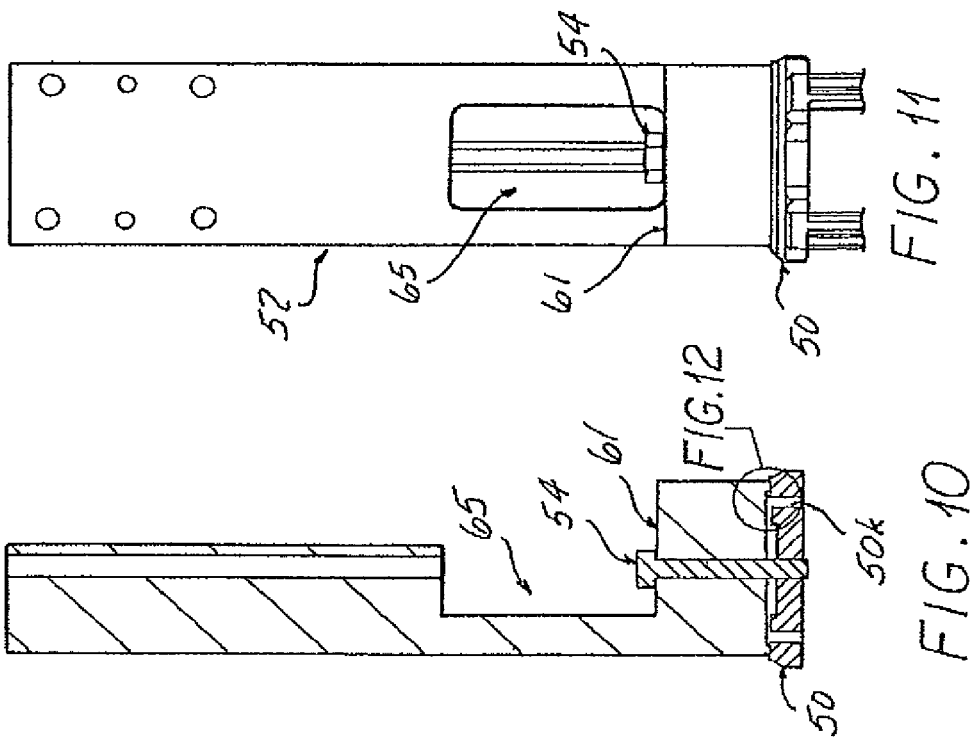
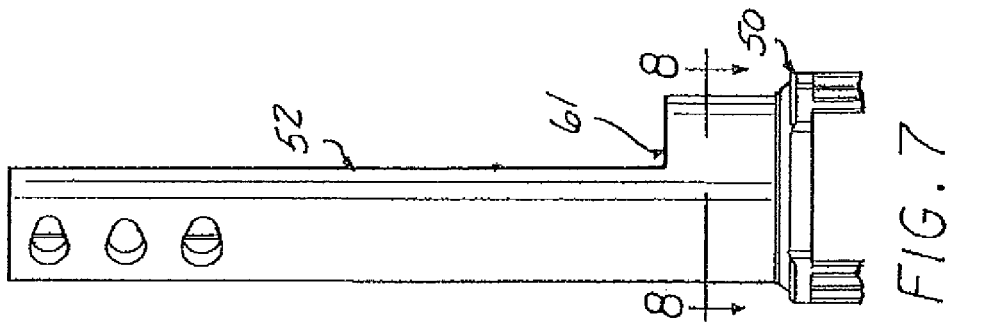

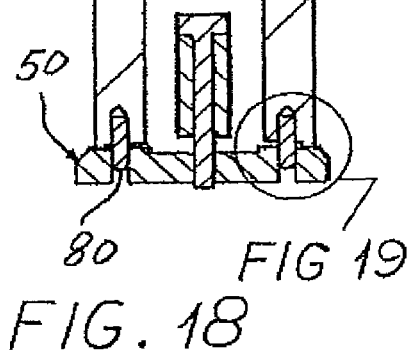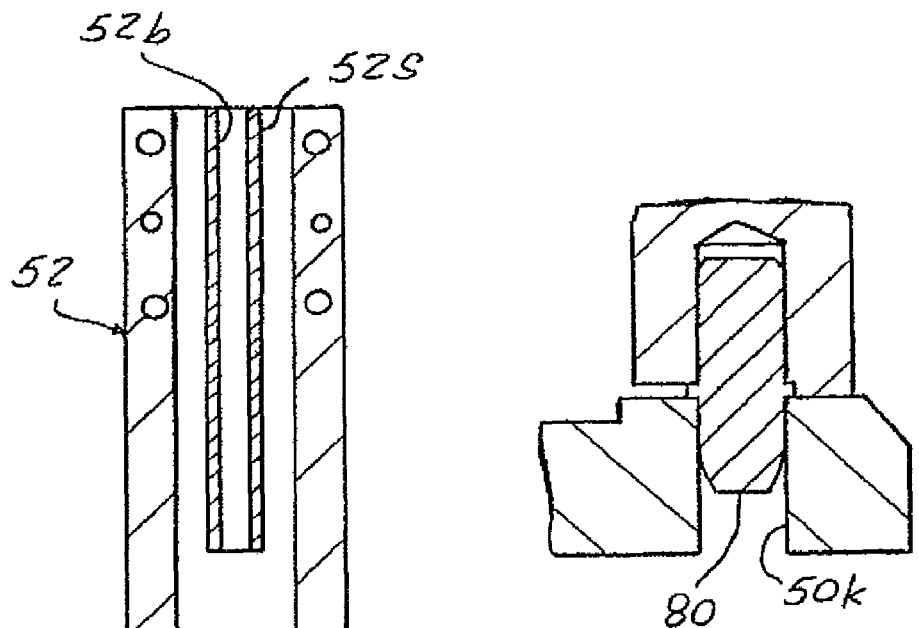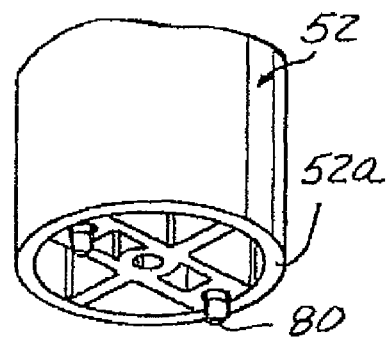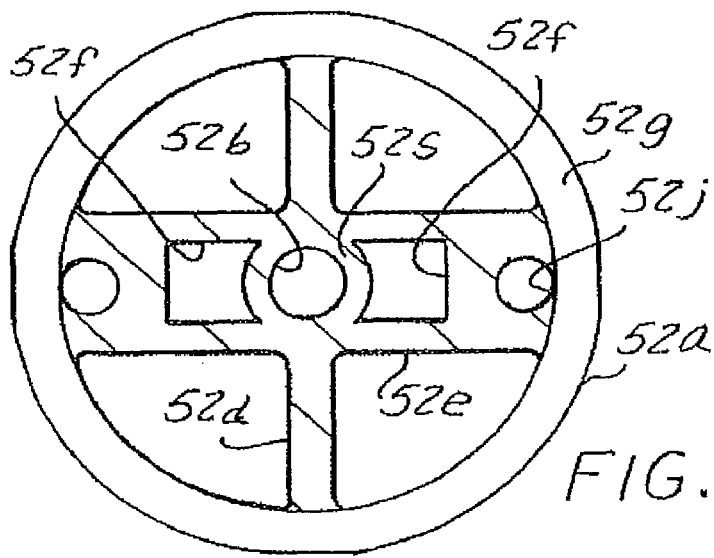

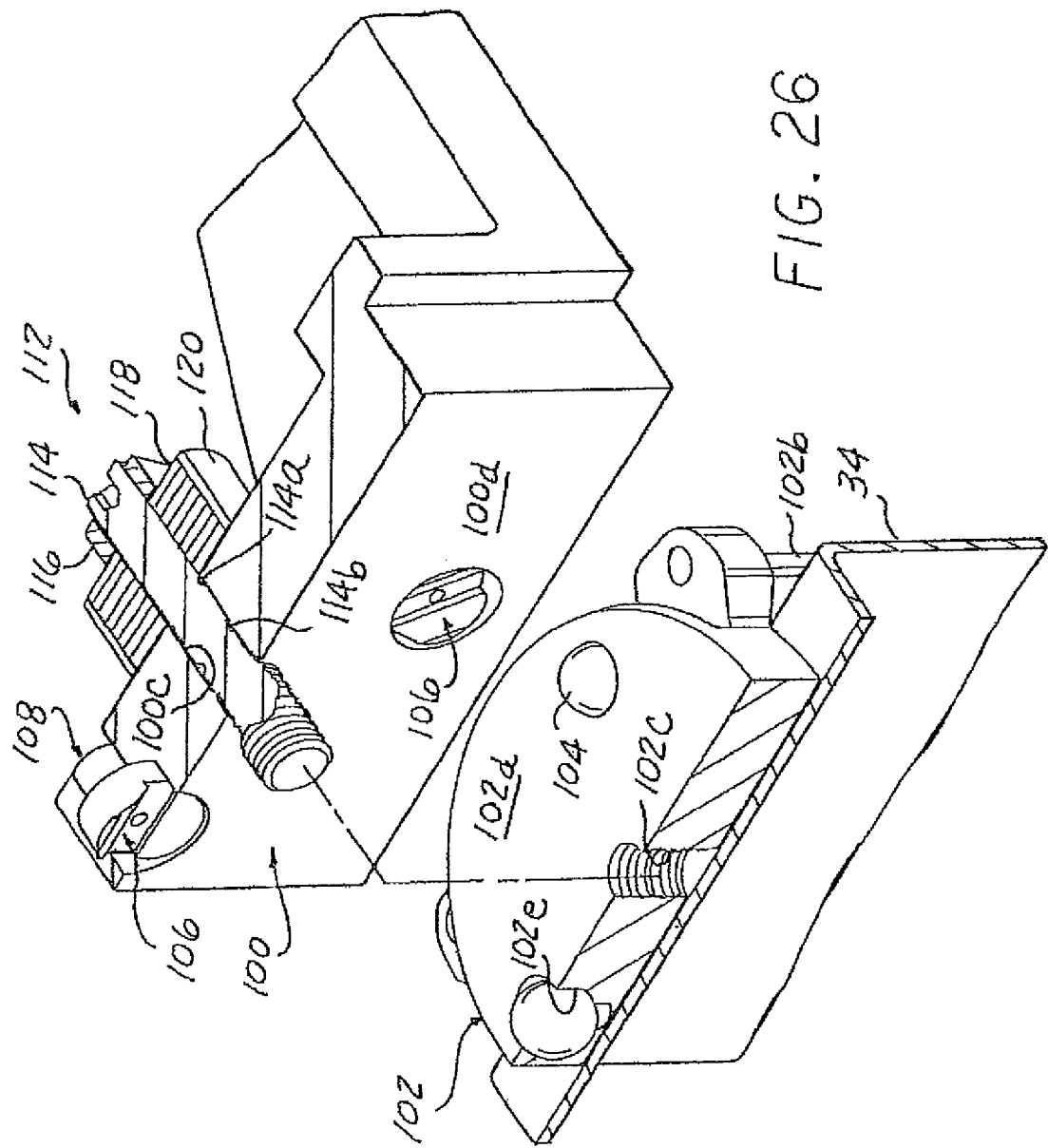

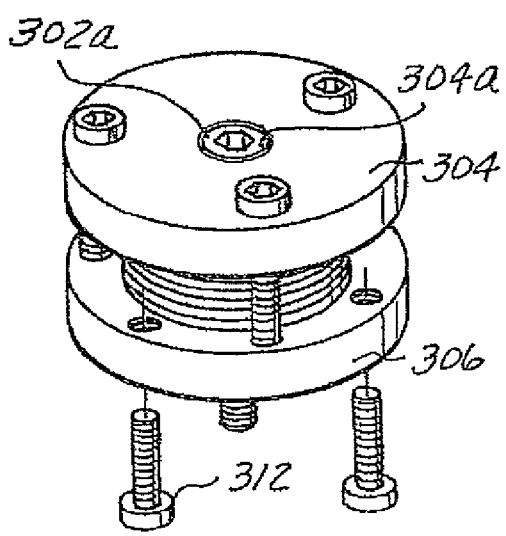
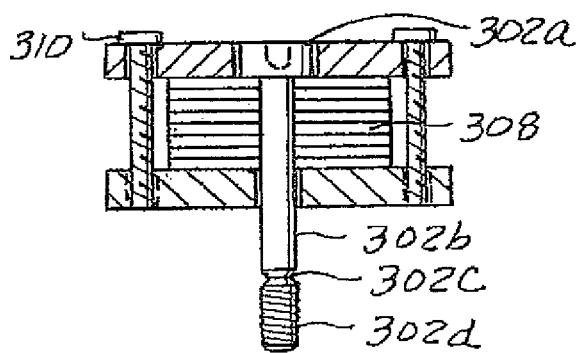
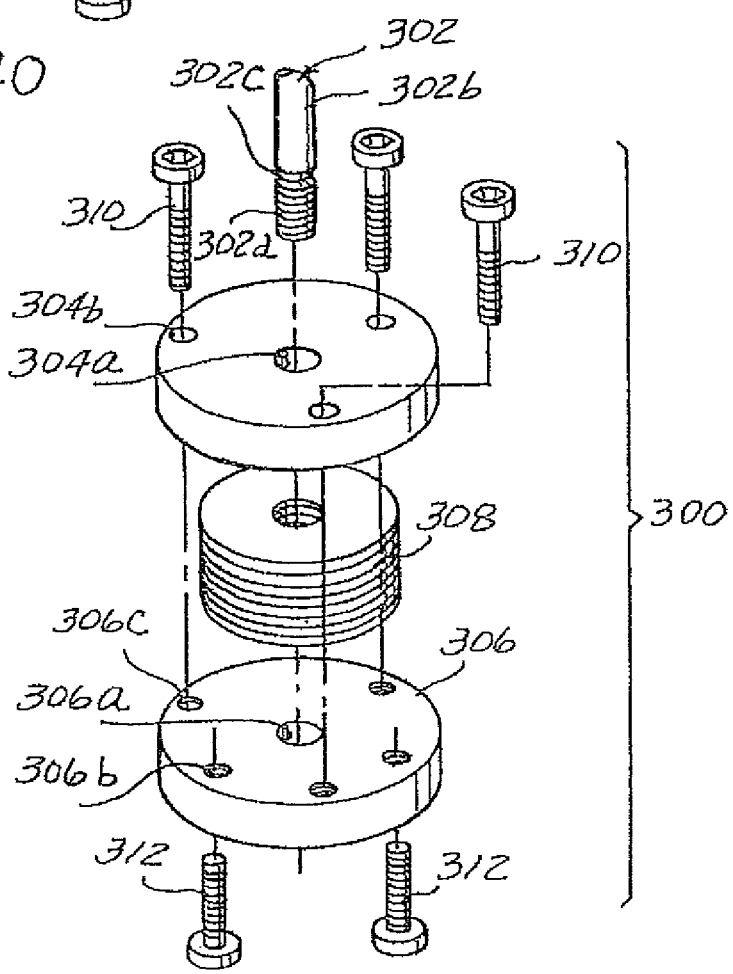
FIG. 40
FIG. 41
FIG. 42

SINGLE RETAINER MOUNTED RISER

RELATED APPLICATION

This application is a divisional of U.S. patent application Ser. No. 12/819,435, filed on Jun. 12, 2010 which is a divisional of U.S. patent application Ser. No. 11/768,482, filed on Jun. 26, 2007, now U.S. Pat. No. 7,784,665 issued Aug. 31, 2010, which is a continuation-in-part of U.S. patent application Ser. No. 11/451,522, filed on Jun. 12, 2006, now U.S. Pat. No. 7,271,367 issued Sep. 18, 2007.

FIELD OF THE INVENTION

This invention relates to a production line framing apparatus for clamping and thereafter welding a loosely assembled vehicle body and more particularly to a framing apparatus that accurately positions and locates predetermined areas of a loosely assembled vehicle body at a welding station for accurately clamping and welding the vehicle body together with a high degree of repeatability between consecutive vehicle bodies on the production line, and yet more particularly to a single retainer mounted riser for use on the framing apparatus.

BACKGROUND OF THE INVENTION

The construction of a unitized vehicle body commences with the formation of individual major body panels by stamping the panels from sheet metal blanks. Typically these major panels include a floor panel, right and left body side panels, a fire wall and either a roof panel or transversely extending header members to which a roof panel is subsequently mounted. After the individual panels are stamped, some preliminary assembly operations may then be performed on the individual panels such as, for example, adding door hinge and latch hardware at the body side panels at appropriate locations proximate the door opening, adding seat mounting brackets, adding reinforcements to the body panel, etc.

Next a set of panels that together constitute a sub-assembly of the finished vehicle body is loosely assembled together. This initial loose assembly of panels frequently is accomplished by a "toy tab" arrangement in which one or more panels is formed with a tab which projects from an edge and which is received in a slot in an adjacent panel. This technique interlocks the panels and frame members to each other to thereby form a preliminary loosely assembled vehicle body wherein the panels and frame members will not separate from each other but wherein the panels and frame members are free to tilt or otherwise move relative to one another. This initial loosely-assembled subassembly is then brought, as for example by a pallet riding on rails, to a welding station where the various panels and frames are welded to each other in a rigid permanently assembled relationship. This initial welding operation step at the welding station is one of the most important steps in the assembly of the vehicle body because it establishes the final welding alignment of all of the various panels and headers relative to each other which is essential to subsequent assembly operations performed on the sub-assembly. During the welding operation it is desirable that the various panels and headers be precisely and accurately located and aligned relative to one another and be held fixedly in the desired position. The positioning of the various panels and header members during the welding operation at the welding station is accomplished utilizing a framing apparatus located at the welding station and including a plurality of gates. For example, a pair of side gates may be utilized in combination with a top gate with the gates moveable between retracted positions, to allow the entry of the vehicle assembly into the welding station, and working positions wherein tooling members carried by the gates suitably engage the assembled body panels to fix them into desired finalized positions whereafter programmable welding robots, each provided with a welding gun, perform welding operations on the assembled body components as they are held in place by the gates and the tooling members.

Prior art welding gates tend to be rather bulky and heavy apparatuses due to the necessity of carrying many and sometimes rather complicated and heavy tooling members and this heavy construction of the gates has necessitated cumbersome and expensive power equipment to move the gates between their retracted and working positions. The bulky and heavy construction of the welding gates has also interfered with the ability of the robots to access the vehicle body components located within the gates.

In an attempt to reduce the bulk and weight of the gates, gates having an open frame or skeletal structure have been utilized but these open frame structure gates, by their fragile nature, have difficulty in handling all of the heavy tooling members and are subject to damage as a result of inadvertent impact with obstacles. Such impacts may not only damage the gate but may also misalign tooling members carried by the gate with resultant imprecise joinder of the various body panels.

SUMMARY OF THE INVENTION

The invention is directed to the provision of an improved framing apparatus for use at a body welding station.

More particularly, this invention is directed to the provision of a framing apparatus utilizing a relatively light weight gate that is yet capable of handling even very heavy tooling members.

Yet more particularly, this invention is directed to the provision of a framing apparatus with breakaway provisions to preclude damage to the gate and/or the tooling members in the event of inadvertent encounters with obstacles.

The body framing apparatus of the invention is intended for use at a welding station and includes a plurality of tooling members for use in positioning components of the body at the welding station for welding, each tooling member being mounted on the framing apparatus by a mounting bracket. Each mounting bracket includes a base for mounting on the framing apparatus and a riser structure mounted on the base by a fastener bolt and mounting a respective tooling member.

According to the invention, the fastener bolt is part of a fastener bolt assembly including the fastener bolt, an upper annular plate surrounding a head of the fastener bolt, a lower annular plate surrounding a shank of the fastener bolt, a compressible annular spring device positioned in surrounding relation to the bolt shank between the upper and lower plates, a plurality of upper attachment bolts passing downwardly through bores in the upper annular plate for threaded engagement with threaded bores in the lower annular plate, and a plurality of lower attachment bolts passing upwardly through bores in the riser structure for threaded engagement with further threaded bores in the lower annular plate, the head of the fastener bolt bearing against the annular spring device so that, with the bolt passing through the bore in the riser structure for threaded engagement with the base, tightening of the fastener bolt compresses the spring device to pretension the fastener bolt.

With this arrangement, and according to the methodology of the invention, following breakage of a fastener bolt, the broken portion of the failed bolt may be removed, the replacement bolt assembly, less the lower attachment bolts, may be positioned on the riser with the bolt shank passing downwardly through a central riser aperture, the lower attachment bolts may be passed upwardly through the riser aperture for threaded engagement with the further threaded bores in the lower annular plate, the riser may be positioned on the base with the lower end of the bolt threadably engaging a threaded bore in the base, the bolt may be tightened to compress the spring device and pretension the bolt, and the upper attachment bolts on the upper annular plate may be removed.

According to a further feature of the invention, each mounting bracket includes a base for mounting on the framing apparatus and each tooling member includes an integral extension arm mounted on and secured to the base.

According to a further feature of the invention, the extension arm is mounted on the base by a single central fastener bolt and the interface between the extension arm and the base comprises a plurality of contact points arranged in concentric relation with respect to the fastener bolt.

According to a further feature of the invention, the contact points are defined by spherical members positioned at the interface.

According to a further feature of the invention, there are three equally angularly spaced spherical members.

According to a further feature of the invention, each spherical member comprises a ball.

According to a further feature of the invention, the fastener bolt includes a reduced diameter portions sized to breakaway in response to a predetermined impact.

According to a further feature of the invention, the spherical members are carried by the base.

According to a further feature of the invention, the spherical members are each received in a spherical socket defined in the base.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 7 is a side elevational view of the base and riser;

FIG. 10 is a cross-sectional view taken on line 10-10 of FIG. 9;

FIG. 11 is a front elevational view of the base and riser;

FIG. 13 is a perspective view of the base and riser shown in association with a tooling member;

FIG. 18 is a cross-sectional view taken on line 18-18 of FIG. 9;

FIG. 19 is a detail view taken within circle 19 of FIG. 18;

FIG. 20 is a fragmentary perspective view of the underface of the riser;

FIG. 23 is a bottom view of the riser;

FIG. 26 is an exploded cross-sectional view of the mounting bracket of FIG. 24;

FIGS. 40-44 are views of a replacement breakaway bolt assembly suitable for use with any of the bracket embodiments.

DETAILED DESCRIPTION OF THE PREFERRED EMBODIMENTS

Figure 1:
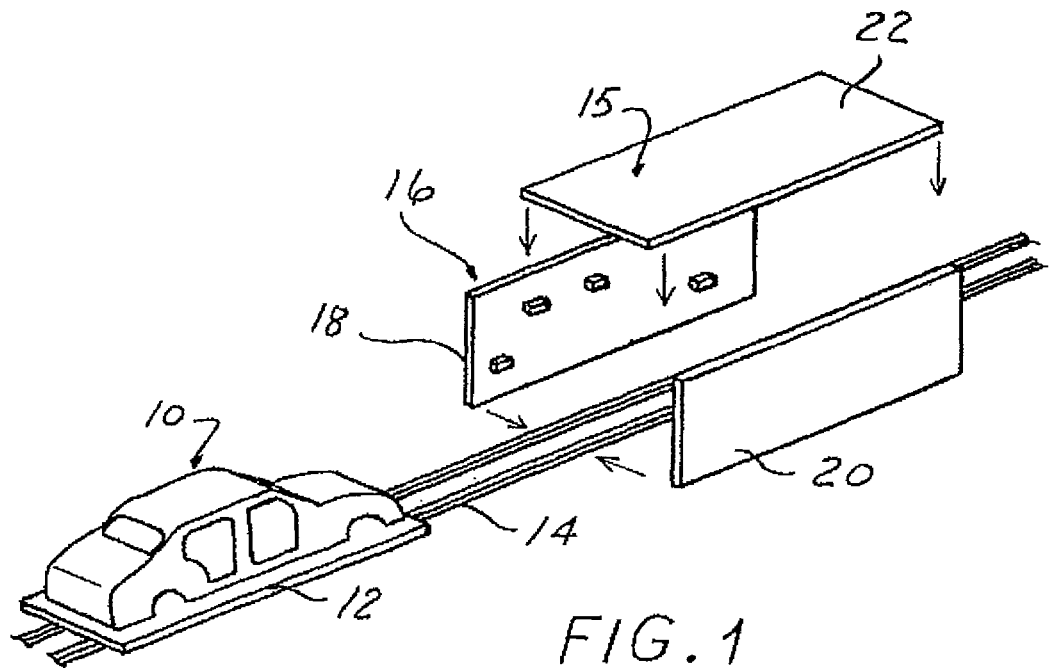
FIG. 1 is a schematic view of a motor vehicle framing production line including a framing station.
Figure 2:
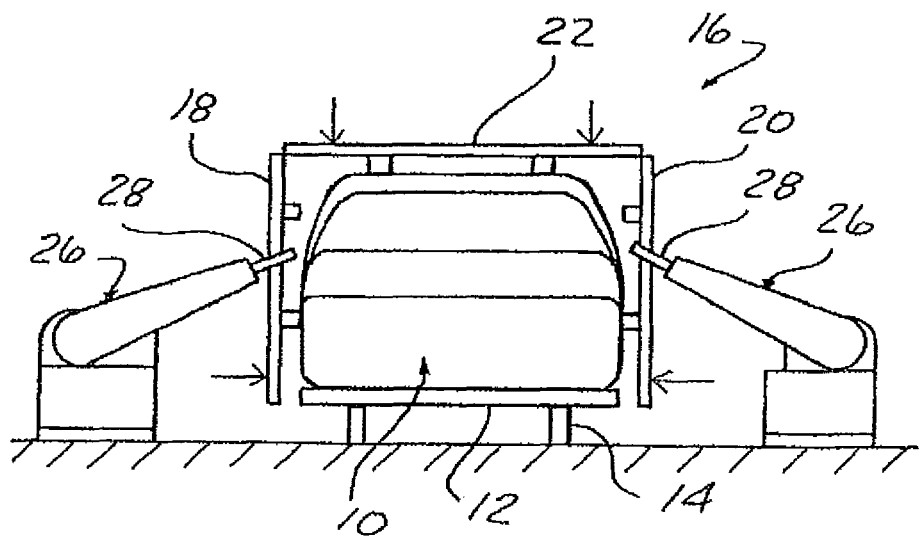
FIG. 2 is a schematic cross-sectional view of the framing station.

With reference to FIG. 1 an initial loosely assembled body subassembly seen generally at 10 is brought, as for example by a pallet 12 riding on rails 14, to a welding station 16 where the various panels and frames are welded to each other in a rigid permanently assembled relationship. The positioning of the various panels and header members during the welding operation at the welding station is accomplished utilizing a framing apparatus 15 including a plurality of gates. For example, as seen schematically in FIG. 1, a pair of side gates 18 and 20 may be utilized in combination with a top gate 22 with the gates moveable between retracted positions seen in FIG. 1, to allow the entry of the vehicle assembly 10 into the welding station, and working positions seen in FIG. 2, wherein tooling members carried by the gate suitably engage the assembled body panels to fix them into desired finalized positions whereafter programmable welding robots 26, each provided with a welding gun 28, perform welding operations on the assembled body components as they are held in place by the gates 18, 20 and 22 and the tooling members 24.

Figure 3:
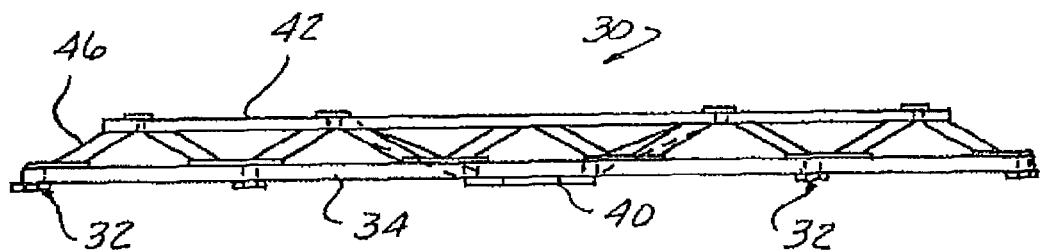
FIG. 3 is a side elevational view of a gate utilized at the framing station.
Figure 4:
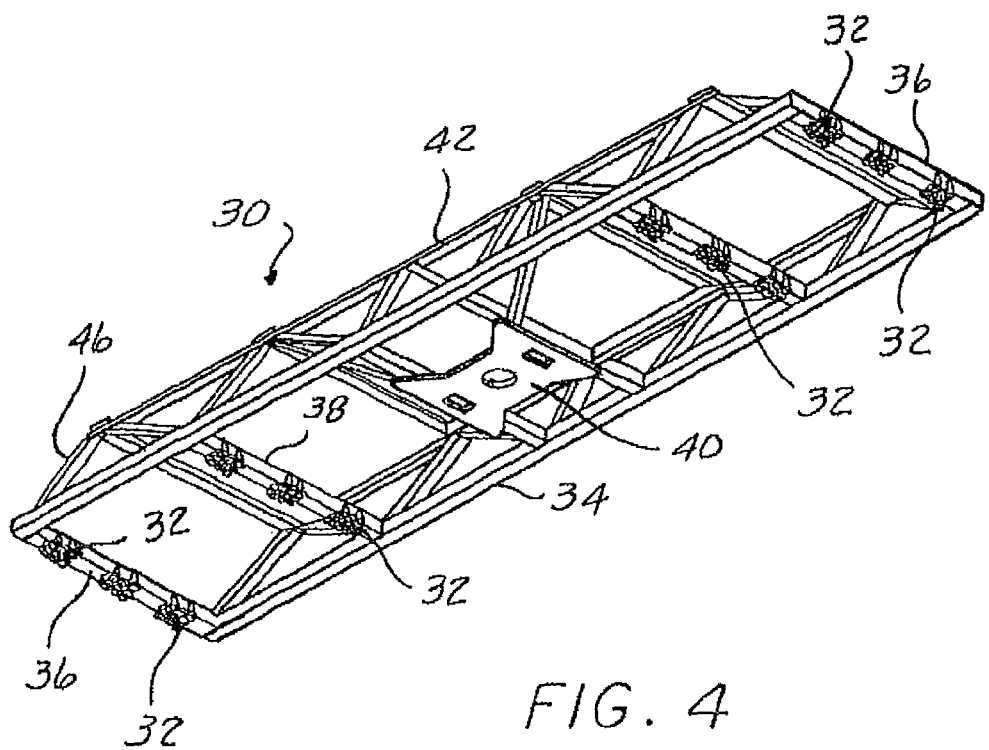
FIG. 4 is a perspective view of the gate viewed from below the gate.
Figure 8:
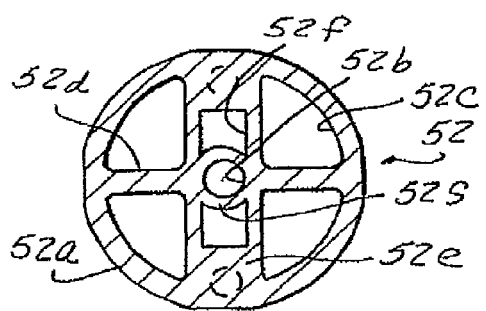
FIG. 8 is a cross-sectional view taken on line 8-8 of FIG. 7.

The framing apparatus of the invention uses an open frame gate structure 30 (FIGS. 3-4) in combination with a plurality of mounting bracket structures 32 to facilitate attachment of the tooling members to the gate. Gate 30, which may comprise either a top gate or a side gate, has an open frame skeletal structure comprising skeletal, parallel, longitudinal side members 34, skeletal end cross-members 36, skeletal intermediate cross-members 38, a central robot mounting plate 40, skeletal upper parallel side rails 42, skeletal upper cross-members 44, and lattice members 46 interconnecting each upper side rail to the respective lower rail. All of the members of the frame are preferably formed of a lightweight tubular material of rectangular cross-section having a wall thickness of, for example, 60 thousandths of an inch and all of the members are formed of a suitable ferrous material. The frame components are secured together by welding utilizing suitable gussets.

Figure 5:
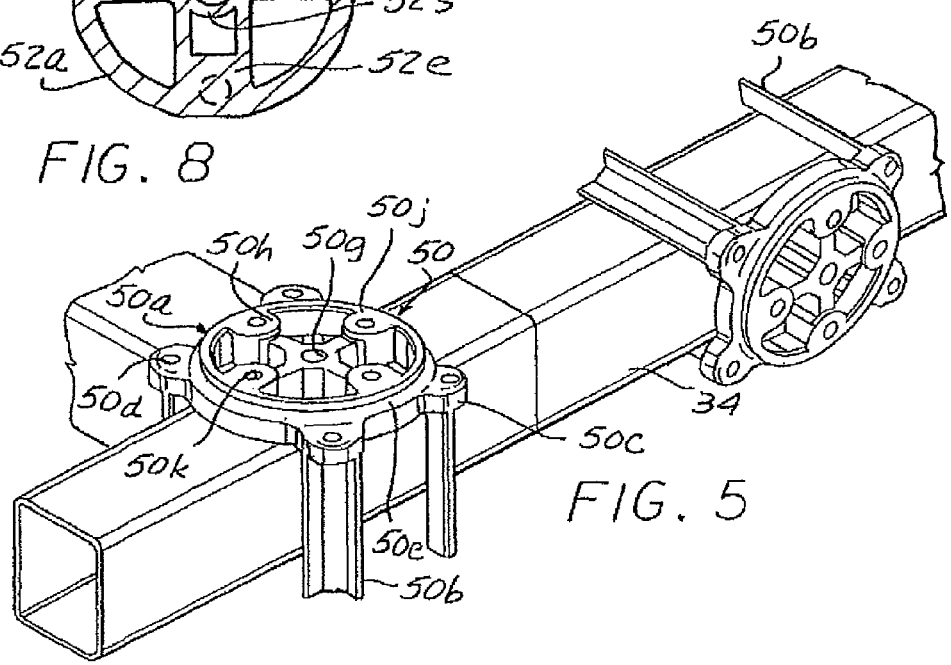
FIG. 5 is a perspective view showing an example of a base mounted to a framing gate member.
Figure 9:
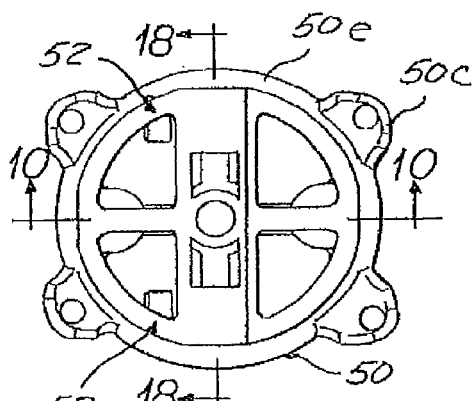
FIG. 9 is a top view of the base and riser.
Figure 12:
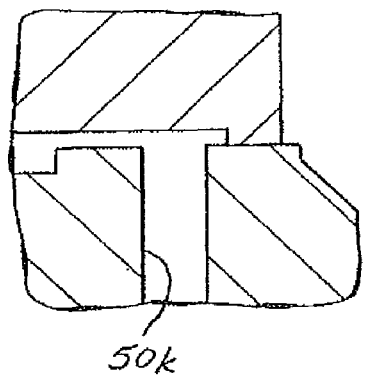
FIG. 12 is a detail view taken within the circle 12 of FIG. 10.
Figure 6:
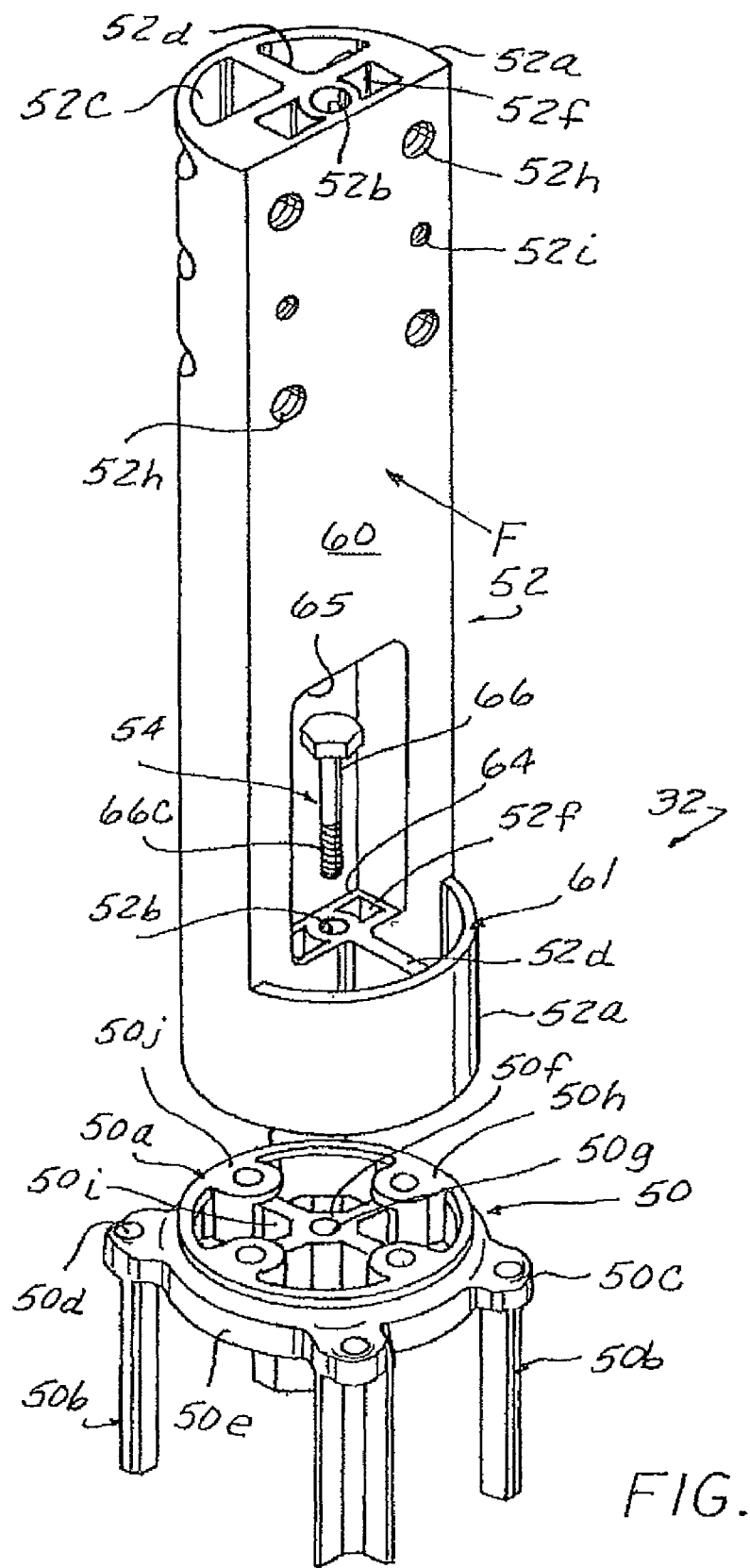
FIG. 6 is a perspective exploded view of a mounting bracket with a base in combination with a riser for mounting on the base.
Figure 14:
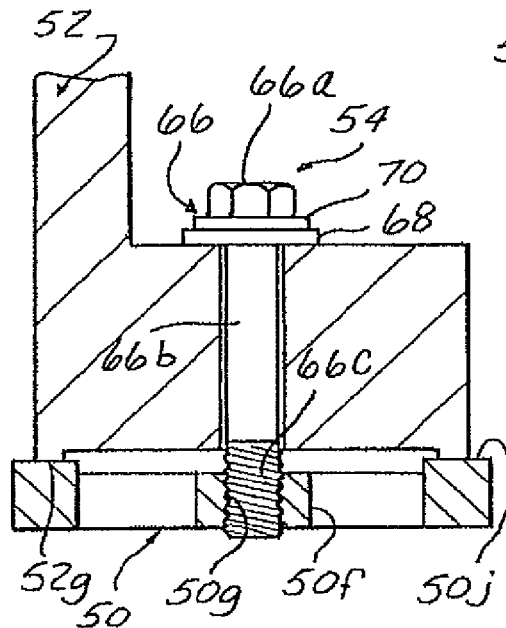
FIGS. 14 and 15 are fragmentary views illustrating the manner in which the invention accommodates production variances or tolerances utilizing a simple bolt.
Figure 15:
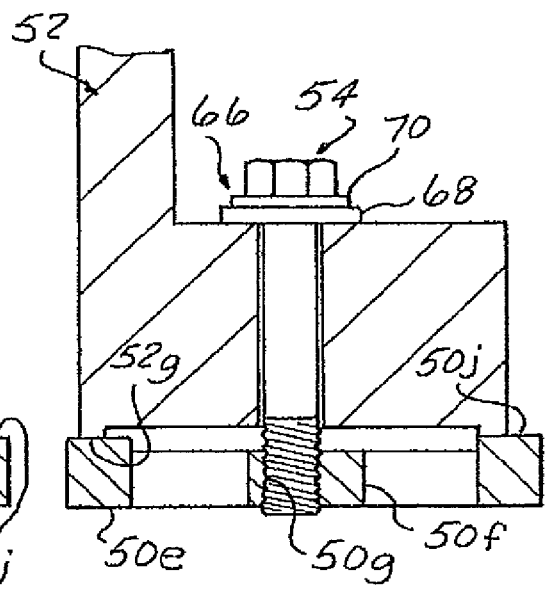

Each mounting bracket structure 32 (FIG. 6-23) includes a base 50, a riser 52, and a bolt structure 54. Base 50 may be formed as a cast ferrous structure and includes a planar platform portion 50*a* and a plurality of legs 50*b* integrally downstanding from the platform portion. Platform portion 50*a* may have a generally circular configuration and legs 50*b* are positioned at circumferentially spaced locations on the outer periphery of the platform portion and each extend downwardly from a lug 50*c* formed integrally with the platform portion. Each leg 50*b* has a right angle cross-sectional configuration and a through bore 50*d* is formed in each lug 50*c* outboard of the respective leg. The platform portion and legs are configured and dimensioned such that the base 50 may be positioned over a skeletal frame member such for example as frame member 34 as best seen in FIG. 5. As shown, the base may be positioned over the top of a skeletal member 34 as seen on the left side of FIG. 5 or over the side of the member 34 as seen on the right side of FIG. 5.

The platform portion 50*a* of each base has a wheel like configuration including an outer rim 50*e*, a central hub 50*f* having a threaded central bore 50*g* positioned proximate the geometric center of platform portion 50*a*, a plurality of circumferentially spaced lugs 50*h* on the inner periphery of the rim, and a plurality of circumferentially spaced spokes 50*i* interconnecting the lugs 50*h* and the hub 50*f*. Lugs 50*c* will be seen to be on the outer periphery of rim 50*e* and circumferentially staggered with respect to the inner peripheral lugs 50*h*. It will be seen that the ring shaped upper face 50*j* of rim 50*e*, as well as the upper face of lugs 50*h*, are spaced above the level of spokes 50*i* and hub 50*f*. That is, the upper face of spokes 50*i* and hub 50 are recessed with respect to the upper face 50*j* of rim 50*e* so that the upper face 50*j* of the rim presents a well defined ring shaped upwardly facing mounting surface.

Each riser 52 is formed as an aluminum extrusion and has a circular cross-sectional configuration including a circular outer rim 52*a*, a central core structure 52*s* defining a central bore 52*b* positioned proximate the geometric center of the riser, a plurality of sector passages 52*c* spaced circumferentially about bore 52*b*, relatively thin aligned spokes 52*d*, relatively thick aligned spokes 52*e*, and passages 52*f* in spokes 52*e* on opposite sides of central bore 52*b*.

Following the extrusion operation, the riser is cut to length (for example 300 mm), machined along a plane 56 (FIGS. 21 and 22) extending parallel to the central axis of bore 52*b* to the level 58 to form a mounting face 60 parallel to and offset from the central axis and a clamping surface 61 perpendicular to the central axis, further machined along the lines 62 to the plane 63 to form a bolt face 64 coextensive with clamping surface 61 and constituting the lower boundary of a pocket 65, further machined at the lower face of the extrusion (FIG. 23) to recess the spokes 52*d* and 52*e* with respect to rim 52*a* so that the rim 52*a* presents a distinctly defined downwardly facing ring surface 52*g*, further machined to form transverse bolt holes 52*h* opening in face 60, further machined to form transverse dowel holds 52*i* opening in face 60, and further machined to form blind axial dowel holes 52*j* opening in the lower face of the riser in spokes 52*e* outboard of passages 52*f* and inboard of ring surface 52*g*.

Figure 16:
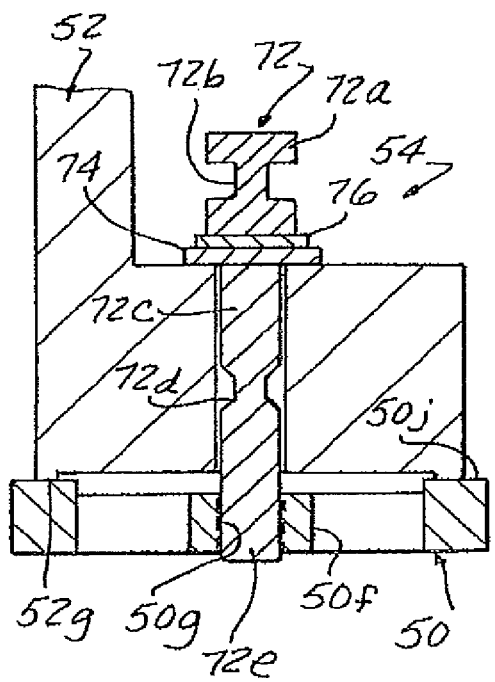
FIGS. 16 and 17 are fragmentary views illustrating the manner in which the invention accommodates production variances using a breakaway bolt structure.
Figure 17:
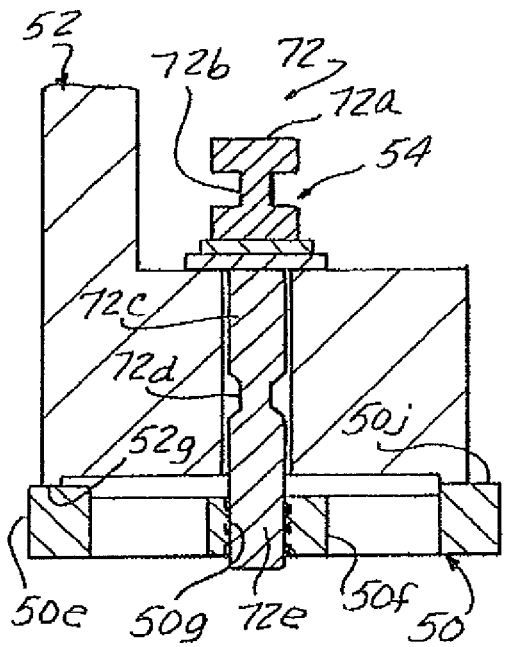
Figure 22:
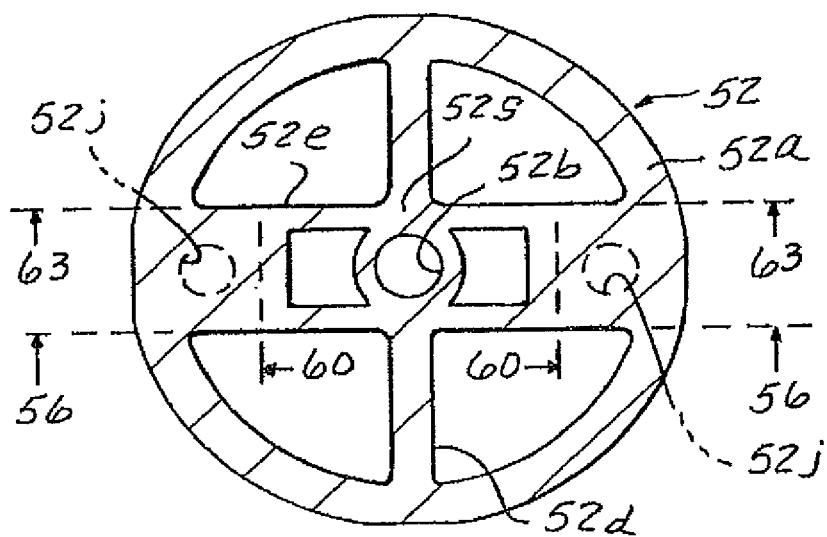
FIG. 22 is a cross-sectional view taken on line 22-22 of FIG. 21.
Figure 21:
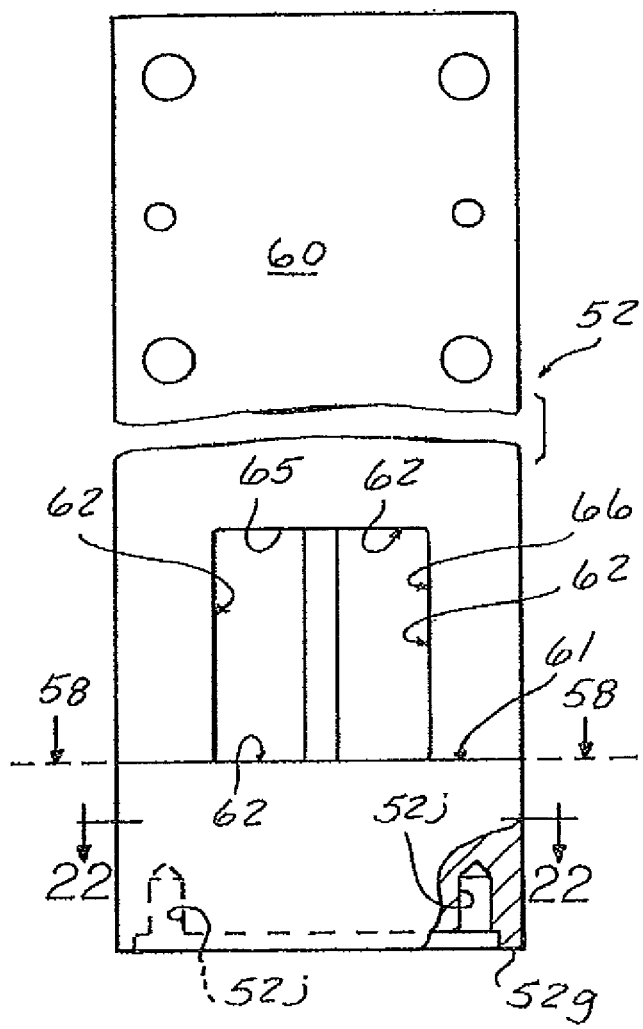
FIG. 21 is a fragmentary elevational view of the riser.
Figure 24:
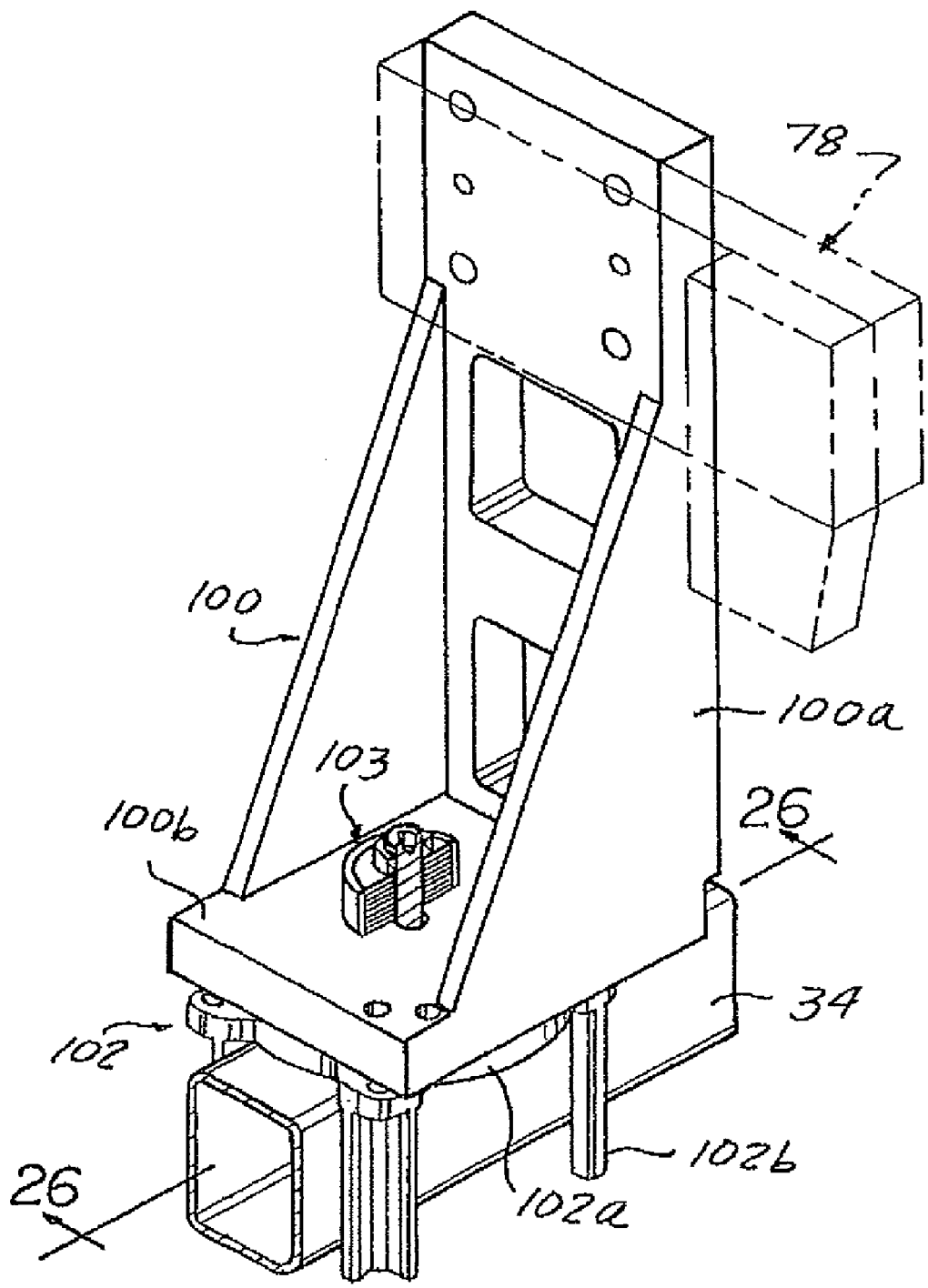
FIG. 24 is a perspective view of an alternate form of a mounting bracket.
Figure 25:
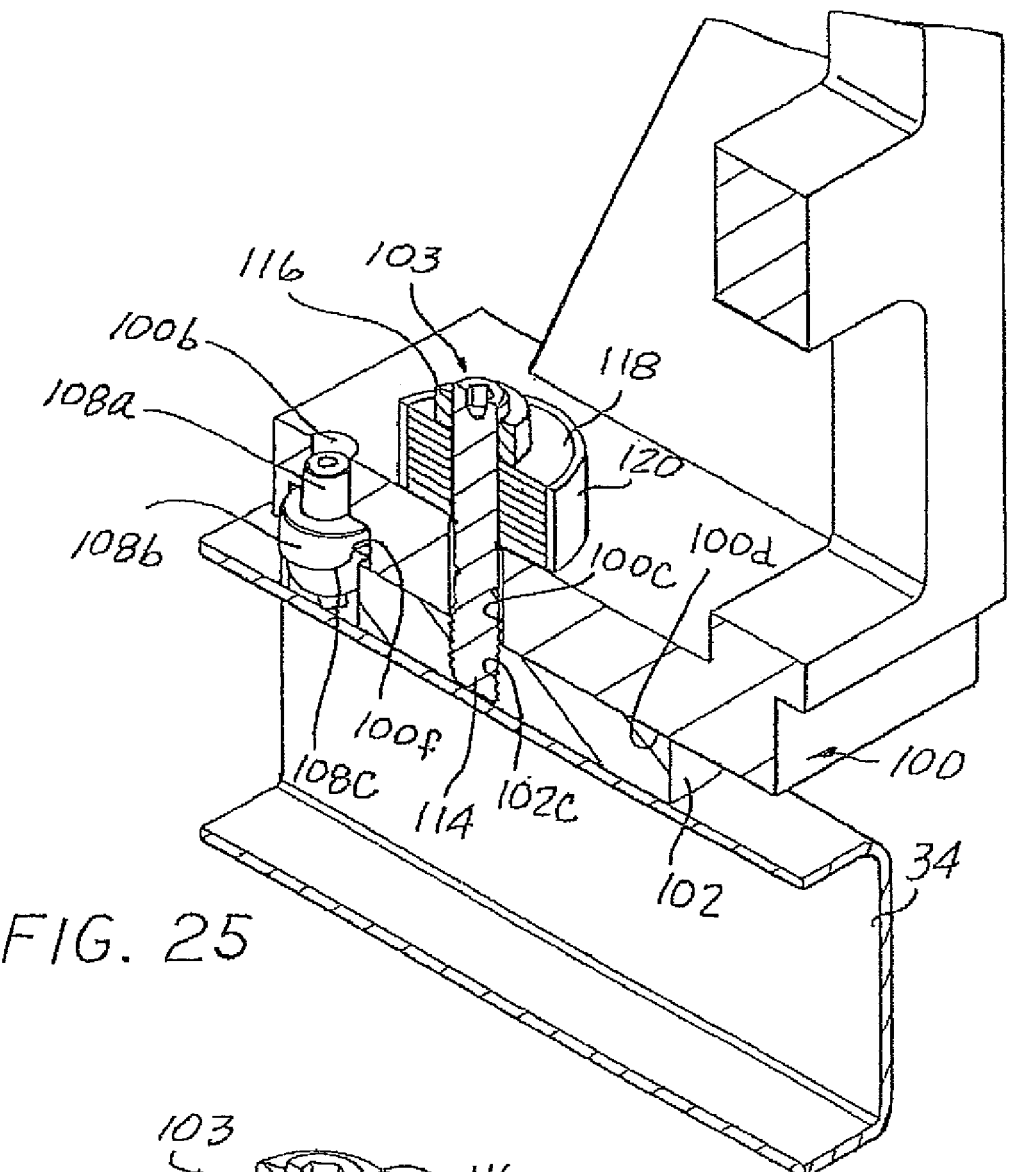
FIG. 25 is a cross-sectional view taken on line 25-25 of FIG. 24.
Figure 27:
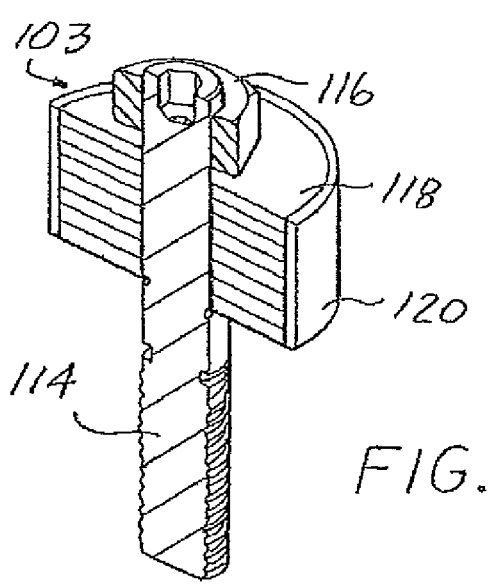
FIG. 27 is a sectional schematic view of a bolt assembly utilized in the mounting bracket of FIG. 24.
Figure 28:
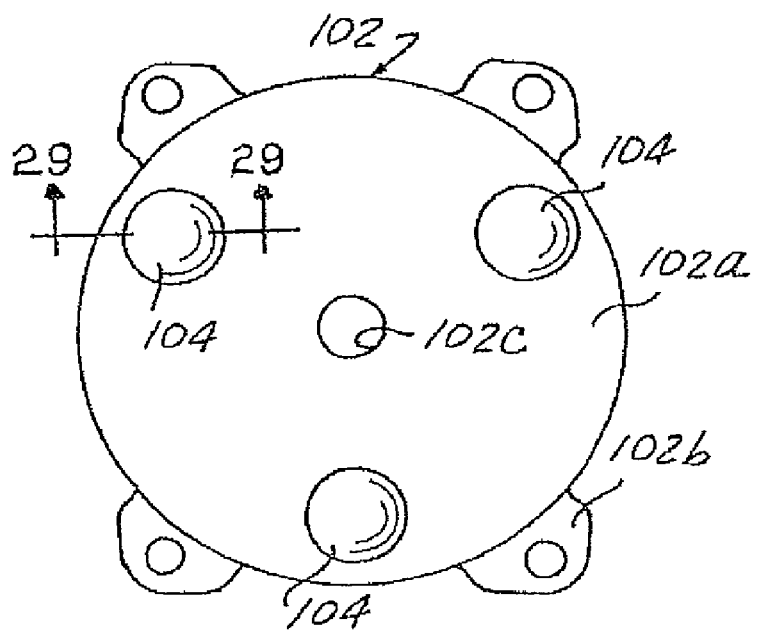
FIG. 28 is a plan view of the base of the mounting bracket of FIG. 24.
Figure 30:
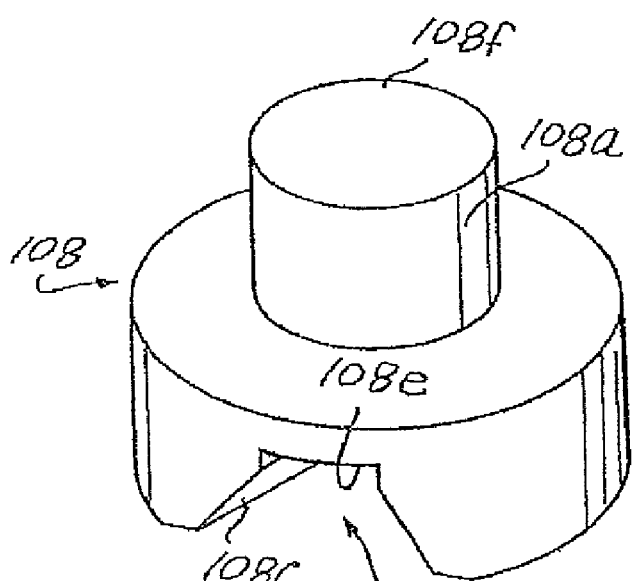
FIG. 30 is a perspective view of a socket pin utilized in the mounting bracket of FIG. 24.
Figure 31:
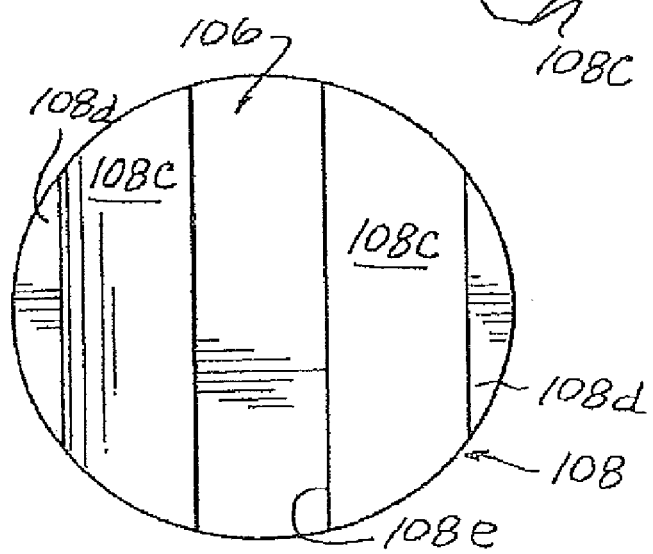
FIG. 31 is a bottom view of the socket pin.
Figure 29:
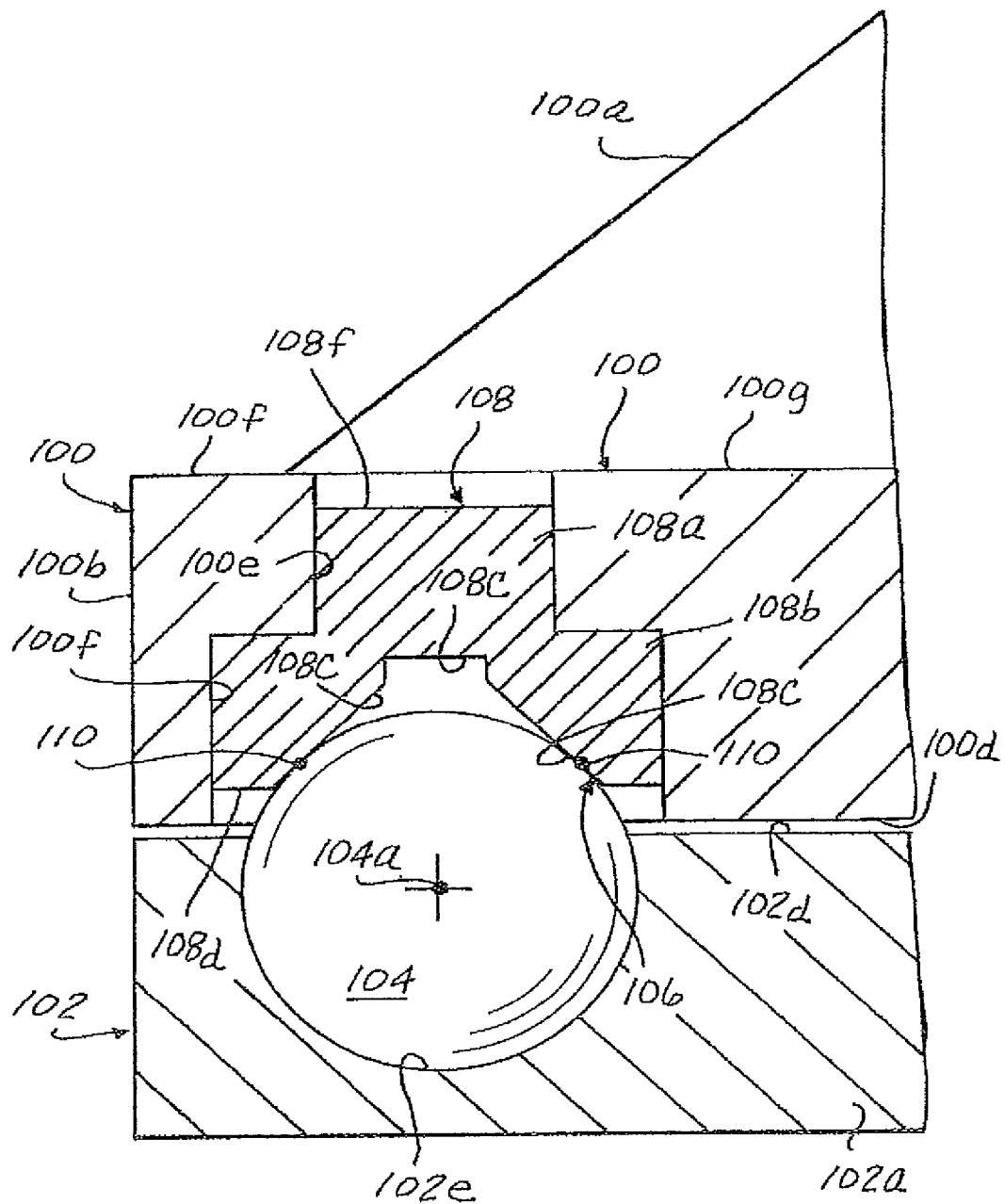
FIG. 29 is a fragmentary cross-sectional view taken on line 29-29 of FIG. 28.
Figure 32:
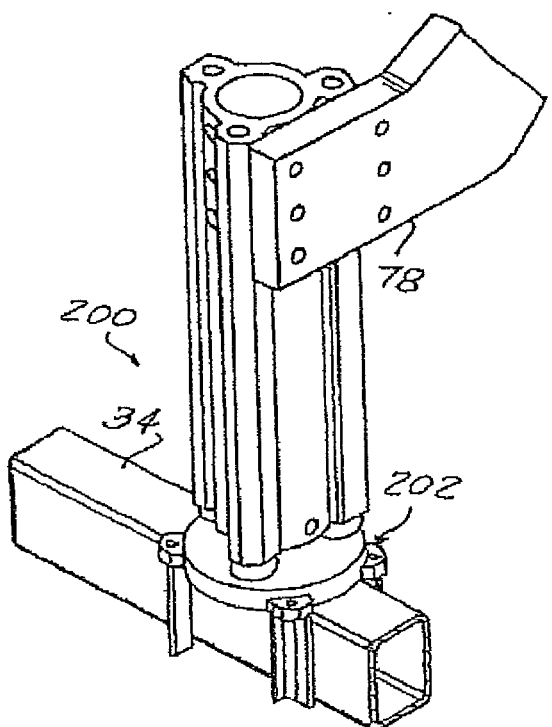
FIG. 32 is a perspective view of a further alternate form of a mounting bracket.

Bolt structure 54, as seen in FIGS. 10, 11, 14, 15 and 18 comprises a bolt 66, a washer 68 and a lock washer 70. Bolt 66 includes a head 66*a*, a smooth shank 66*b* and a threaded shank 66*c*. Alternatively, where a breakaway provision is desired, and as seen in FIGS. 16 and 17, bolt structure 54 may include a bolt 72, a washer 74 and a lock washer 76. Bolt 72 includes a tightening head 72*a*, a reduced diameter head portion 72*b*, a smooth shank portion 72*c*, a reduced diameter breakaway portion 72*d*, and a threaded shank portion 72*e*.

It will be understood that one or more bracket structures 32 are positioned on one of the skeletal members of the frame structure at any location along the frame structure where it is desired to position a tooling member to engage a body component. The tooling member, which may typically comprise a clamp, is seen schematically at 78 in FIG. 13.

In use, a base member 50 is positioned over a skeletal member of the frame with the legs in straddling relation to the skeletal member and the underface of the platform portion of the base positioned against the skeletal member whereafter the base is welded to the frame member over the entire U-shaped interfaces between the base and the frame member as defined by the coaction of legs 50*b* and the platform portion 50*a*.

A pair of dowel pins 80 are now press fit in diametrically opposed bores 50*k* in the platform portion of base 50; a riser 52 is positioned against the platform portion to pass the exposed upper ends of the dowels into bores 52*j*; and a bolt 66 is passed through the central bore 52*b* of the riser to engage the threaded shank portion 66*c* of the bolt with the threaded bore 50*g* of the platform portion of the base member. Tightening of the bolt, in coaction with washers 74 and 76, will be seen to engage the bolt head 66*a* with the bolt face 64 and firmly press riser ring surface 52*g* against base ring surface 50*j* to firmly and positively clamp the riser to the base. Since the interface between the riser and the base is only along well defined ring surfaces, the riser will engage the base in a triangulated manner to provide a firm positive inter-engagement as between the riser and the base. It is also critical that the riser dimension between the bolt face 64 and the lower face of the riser be sufficient to insure that the riser structure within the ring surface 52*g* remain rigid and not flex or distort as the bolt is tightened since such flexing or distorting might interfere with the firm positive triangulated inter-engagement of riser surface 52*g* and base surface 50*j*. Following mounting of the riser on the base, a tooling member, for example a clamp 78, may be mounted on the riser utilizing a blade 82 (FIG. 13) fastened to the mounting face 60 of the riser utilizing bolts and dowel pins passing through bolt holes 52*h* and dowel holes 52*i* and through aligned bolt holes and dowel holes in the blade.

If a breakaway provision is desired, a breakaway bolt 72 is employed, the bolt is tightened utilizing head 72*a* until the bolt head seats against the bolt face 64, and further torque is applied to the bolt by the head 72a until the reduced diameter portion 72b shears. It will be understood that reduced diameter portion 72b is designed to shear before reduced diameter portion 72d and that the tightening of the bolt structure until the reduced diameter portion 72b shears has the effect of pretorquing the bolt to the torque level required to shear the reduced diameter portion 72b. In use at the framing station, each open frame gate structure 30 is positioned by a robot which is secured to robot mounting plate 40 and programmed is known manner. Ideally, the robot moves the gate into position at the framing station without encountering any obstacles and therefore without damaging the tooling members or, more importantly, the delicate frame structure. However, if an obstacle is encountered, the obstacle will typically exert a force F against the vertical portion of a riser which in turn will cause the riser to tilt which in turn will result in shearing or rupture of the reduced diameter bolt portion 72d which in turn will allow the riser and associated tooling member to breakaway from the base 50 and preclude twisting or other damage to the delicate frame structure 30 and/or dislocation of the tooling member carried by the riser with consequent misassembly of the respective automotive body components. The defined inter-engaging ring surfaces on the riser and the base have the effect of defining a locus of points equal distant from the center line of the breakaway bolt 72 so that no matter in which direction the impact F is exerted on the riser vertical portion the same moment will be applied to the riser and to the bolt structure and the same force F will result in an identical rupture pattern with respect to the reduced diameter bolt structure portion 72d.

The single central mounting bolt in combination with the dowel pins 80 provides a firm, positive locating of the riser on the base and the defined ring surface interface between the lower face of the riser and the upper face of the base insures a firm positive triangulated mounting of the riser on the base. As compared to a prior art riser mounting arrangement employing four quadranted bolt holes with dowel holes positioned between the bolt holes, the invention riser mounting system employs a single central bolt hole, a single central bolt and a pair of flanking dowel pins providing considerable savings in both materials and labor. The invention riser, by virtue of its extruded construction, also provides significant material savings as compared to prior art risers and the invention riser, by virtue of its aluminum extrusion formation, provides considerable weight savings as compared to prior art risers.

The illustrated and described base and riser structure also allows ready provision to accommodate production variances or tolerances. Specifically, as best seen in a comparison of FIGS. 14 and 15 and FIGS. 16 and 17, production variances or tolerances can readily be accommodated by adjusting the position of bore 50g within hub 50f and, in this respect, base ring surface 50j preferably has a greater width than riser ring surface 52g so that ring surface 52g may adjust on surface 50j in response to movement of bore 52g within hub 50f without interfering with the firm positive triangulated inter-engagement of the ring surfaces.

Especially in installations employing a breakaway bolt structure, the bores 52d in the lugs 50c may be utilized to anchor cables to tether the riser to the base to limit the movement of the riser relative to the base in the event of a breakaway.

The alternate mounting bracket construction seen in FIGS. 24-31 includes a riser 100, a base 102, and a fastener assembly 103.

Riser 100 includes a riser portion 100a and a rectangular platform portion 100b. Platform portion 100b includes a central unthreaded aperture 100c.

Base 102 includes a circular platform portion 102a and a plurality of circumferentially spaced legs 102b extending integrally from the platform portion for straddling, welded mounting on a skeletal member of the frame structure as described with respect to the FIGS. 1-23 mounting bracket construction. Circular platform portion 102a includes a central threaded aperture 102c.

Figure 33:
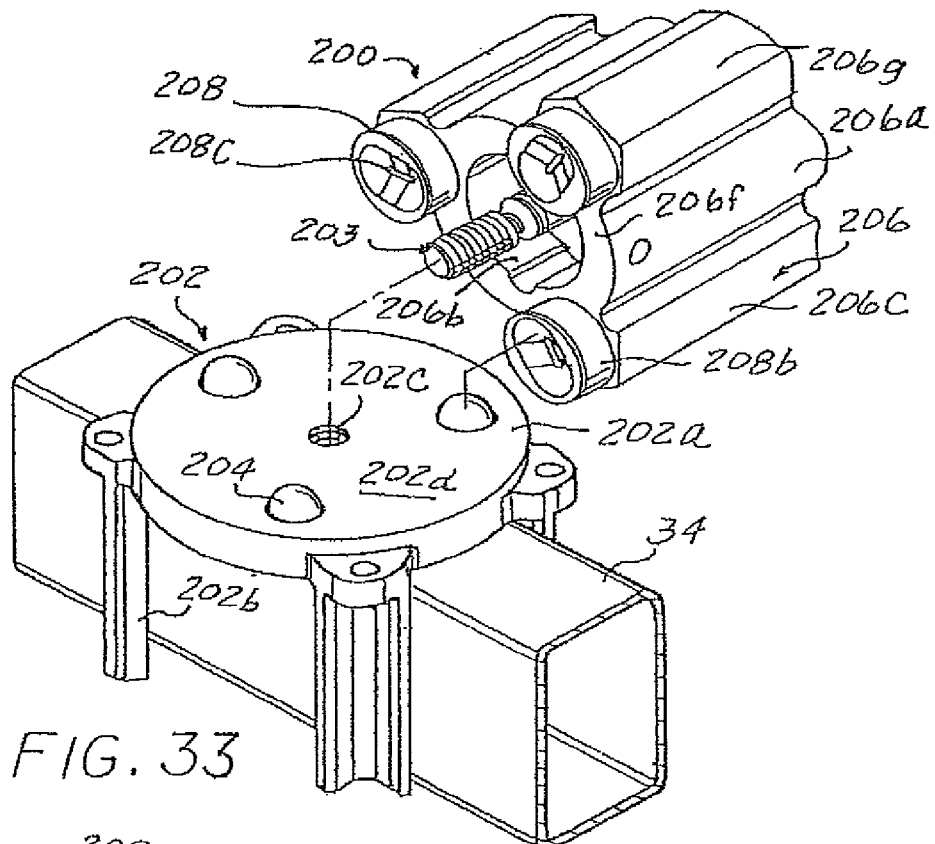
FIG. 33 is an exploded view of the mounting bracket of FIG. 32.
Figure 37:
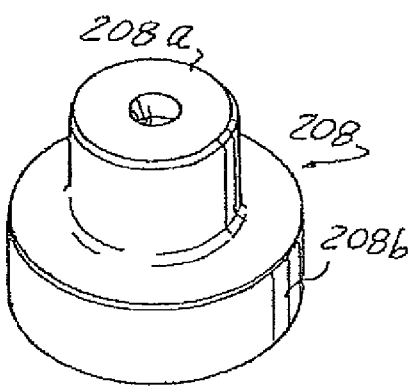
FIGS. 37, 38 and 39 are detail views of socket pins utilized in the mounting bracket of FIG. 32.
Figure 38:
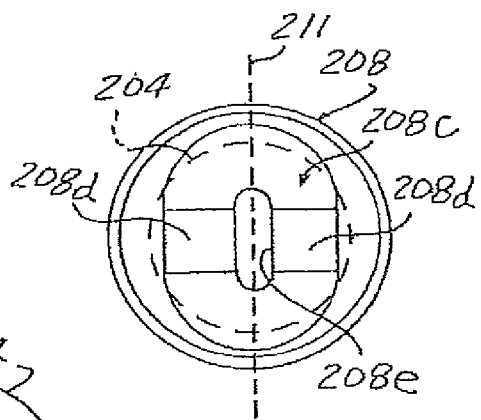
Figure 39:
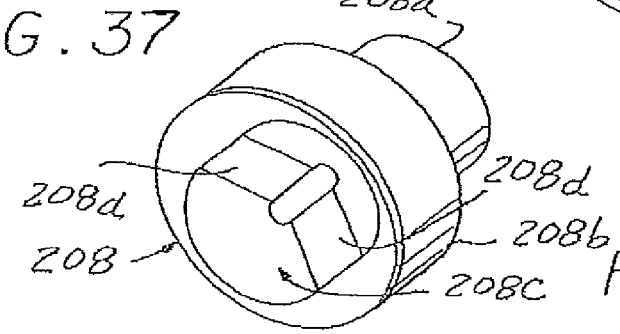

Riser 100 is mounted and located on the base 102 utilizing fastener assembly 103 and a plurality of spherical members positioned at the interface between the riser and the base in concentric surrounding relation to the central axis of apertures 100c and 102c. Specifically, riser 100 is mounted on the base 102 utilizing three balls or spheres 104, provided on the upper face 102d of the base platform portion 102a in concentric relation to aperture 102c and at equal 120° spacing (see also FIGS. 28 and 33 which illustrate such spacing), seating in three V-shaped locating socket grooves 106 provided in the lower face 100d of the riser platform portion in concentric relation to aperture 100c, at equal 120° spacing, and in vertical alignment with respective balls 104.

Each locating socket groove 106 is defined by a socket pin 108. Each socket pin 108 includes a circular locator portion 108a and a main body or base portion 108b. The socket groove 106 is defined in the lower face of main body portion 108b and, specifically, is defined by two outwardly splayed flat surfaces 108c opening in the lower annular face 108d of the main body portion 108b with a notch 108e defined at the upper converging edges of the flats 108c.

Each socket pin 108 is fitted in a bore in the platform portion 100b of the riser 100 and, specifically, the locator portion 108a of the pin is fitted in a bore 100e in the riser platform portion and the base portion 108b is fitted in a counter bore 100f in the riser platform portion. Each pin may be press fit in the respective bore of the riser with the lower face 108d of the pin spaced or recessed upwardly with respect to the lower face 100d of the riser platform portion and the upper face 108f of the pin recessed or spaced downwardly from the upper face 100g of the riser platform portion. Each groove 106 defines a central axis 109 and the pins 108 are positioned in the bores 100f such that all of the axes 109 pass through the center of central aperture 100c.

Each ball or sphere 104 is positioned in a spherical socket 102e in the base platform portion with the center 104a of the sphere positioned below the upper face 102d of the base to preclude displacement of the ball from the base. The ball may be swively mounted in the base or may be fixedly secured in the base and may be mounted in the base by any known procedure including depositing the ball in a frozen condition into the socket 102e and then allowing the ball to expand to fixedly fill the socket. Each ball 104 and respective socket pin 108 are configured and dimensioned such that the ball 104 and socket groove 106 contact each other only at two points 110.

Fastener assembly 103 includes a fastener bolt stud 114, a nut 116, a plurality of stacked Belleville washers 118, and a retainer cup 120. In the assembled relation of the riser and base, the bolt stud 114 passes through the central unthreaded bore 100c in the riser platform portion for threaded engagement with the threaded central bore 102c in the base platform portion with the nut 116 pressing downwardly against the stacked Belleville washers 118 retained within cup 120 to press the riser against the base. The various parameters are chosen such that with the riser engaging the balls 104 at the total of six points 110, a clearance is defined between lower riser platform portion face 100d and upper base platform portion face 102d of, for example, 10 mm Bolt stud 114 includes a O-Ring groove 114a and a reduced diameter breakaway groove 114b.

It will be understood that, in use, a tooling member such as a clamp 78 will be attached to the upper end of the riser portion 100a of the riser in the manner previously described with respect to the FIGS. 1-23 embodiment.

Whereas the embodiment of FIGS. 24-31 has been described as including balls mounted in the base seating in V-shaped grooves provided in the riser, this arrangement can be reversed with the balls being provided in the lower face of the riser and the V-shaped grooves being provided in the upper face of the base with the specific arrangement determined by the requirements of any particular application.

Rather than Belleville washers shown as part of the bolt assembly, springs or a urethane block may also be employed for the same purpose. The Belleville washer/spring/urethane block provision allows the assembly to maintain rigidity even when the fastener is being stretched as well as providing a "shock absorbing" aspect in case of collision.

The arrangement of FIGS. 24-31 enables breaking of the bolt stud 114 at the shear point 114b when the riser is subjected either to bending, tortional loading or shear loading. The three locator configurations, with the ball/groove arrangement provided 120° apart, creates three distinct axes of pivoting defined by the centers of two spheres/balls providing a consistent lever from the center of the fastener, and a consistent shear behavior, irrespective of the location or direction of the impact against the riser. The arrangement of FIGS. 24-31 provides a firm triangulated interface between the base and riser and provides excellent repeatability for mounting the riser to the base since the three spheres may be seated in the grooves in only one precise configuration.

The alternate mounting bracket construction seen in FIGS. 32-39 includes a riser 200, a base 202 and a fastener assembly 203.

Base 202 corresponds generally to the base 102 of the FIGS. 24-31 embodiment and includes a circular platform portion 202a and a plurality of circumferentially spaced legs 202b extending integrally from the platform portion for straddling welded mounting on a skeletal member 34 of the frame structure as described with respect to the FIGS. 1-23 mounting bracket construction.

Circular platform portion 202a includes a central threaded aperture 202c and three balls or spheres 204 are provided on the upper face 202d of the platform portion in concentric relation to central aperture 202c and at equal 120° spacing. Each ball 204 is positioned in a spherical socket 202e in the platform portion with the center 204a of the sphere positioned below the upper face 202d to preclude displacement of the ball from the base. The ball may be swively mounted in the base or may be fixedly secured in the base and may be mounted in the base by any known procedure including depositing the ball in a frozen condition into the socket 202e and then allowing the ball to expand to fixedly fill the socket.

Riser 200 includes a tubular member 206, a plurality of socket pins 208 and an annular plate 210.

Tubular member 206 may be formed as an extrusion and may include a main body tubular portion 206a defining a central axial bore 206b and a plurality of circumferentially spaced external rib portions 206c each defining an axial bore 206d.

A bore 206e is provided at the lower end 206f of the riser in coaxial counter-bore relation to each axial bore 206d. External rib portions 206c will be seen to define flat faces 206g to facilitate the attachment of a suitable tooling member 78.

Each socket pin 208 includes a pilot portion 208a for press fit in a respective bore 206e and a main body portion 208b defining a groove 208c for seating a respective ball 204.

Each groove 208c has a bowl shaped configuration and defines two outwardly splayed flat surfaces 208d with a notch 208e defined at the upper converging edges of the flats 208d. Each groove 208c defines a central axis 211 and the pins 208 are positioned in the bores 206c such that all of the axes 211 pass through the central axis of threaded aperture 202c.

Each ball 204 and respective socket pin 208 are configured and dimensioned such that the ball 204 and the socket groove 208c contact each other only at two points 212.

Annular plate 210 is positioned in bore 206b proximate the lower riser end 206f on a sill or shoulder 206h and defines a central unthreaded aperture 210a.

Fastener assembly 203 includes a breakaway fastener bolt 214 and a stack of Belleville washers 216.

Belleville washers 216 are positioned on plate 210 in concentric relation to aperture 210a and the shank 214a of breakaway bolt 214 passes downwardly through the Belleville washers and through aperture 210a with the head 214b of the bolt pressing downwardly on the stack of Belleville washers and the threaded lower end 214c of the bolt threadably engaging the threaded central aperture 202c in base platform portion 202a.

In use, the riser is positioned on the base with the grooves 208c seating on the balls 204 at a total of six defined points 212, whereby to positively locate and position the riser on the base, whereafter bolt 214 is tightened to threadably advance the threaded lower end 214c into base central aperture 202c whereby to compress the Belleville washers and place the bolt in pretension so that any significant impact against the riser will have the effect of shearing the breakaway bolt at the reduced diameter portion 214d.

FIGS. 40-44 illustrate a breakaway bolt assembly replacement kit 300 which may be used with any of the previously described mounting bracket structures to facilitate the replacement of a broken breakaway bolt. Kit 300 is hereafter described with reference to the mounting bracket structure of FIGS. 24-31 but, as noted, may also be readily utilized with appropriate modification with the mounting bracket structures of FIGS. 1-23 or FIGS. 32-39.

Kit 300 includes a fastener bolt 302 having a head 302a, a shank 302b, a reduced diameter portion 302c and a threaded lower end 302d; an upper annular plate 304 having a central aperture 304a surrounding the head 302a of the fastener bolt; a lower annular plate 306 having a central bore 306a surrounding the shank 302b of the fastener bolt; a stack of Belleville washers 308 positioned in surrounding relation to the bolt shank portion 302b between the upper and the lower plates; a plurality of upper attachment bolts 310 passing downwardly through unthreaded bores 304b in the upper annular plate for threaded engagement with threaded bores 306b in the lower annular plate; and a plurality of lower attachment bolts 312 sized to pass upwardly through unthreaded apertures 100h in the riser platform portion 100b for threaded engagement with further threaded bores 306c in lower plate 306.

In use of the kit with the bracket structure of FIGS. 24-31, and following breakage of a fastener bolt at a reduced diameter portion in response to a predetermined impact against the riser, the broken portions of the failed bolt may be removed from the riser and from the base whereafter the kit 300, minus the lower attachment bolts 312, may be positioned on the riser 100b with the bolt shank passing downwardly through riser central aperture 100c, whereafter the lower attachment bolts 312 may be passed upwardly through riser apertures 100h for threaded engagement with threaded bores 306c in the lower plate, whereafter the riser may be positioned on the base with the lower threaded portion 302d of bolt 302 threadably engaging threaded base aperture 102c and grooves 106 seating on balls 104, whereafter the bolt may be tightened to compress the Belleville washers 308 to pretension the bolt (for example to 10 ft. lbs.) whereafter the upper attachment bolts 310 and the upper plate 304 may be removed and discarded. The system is now ready for production.

Figure 43:
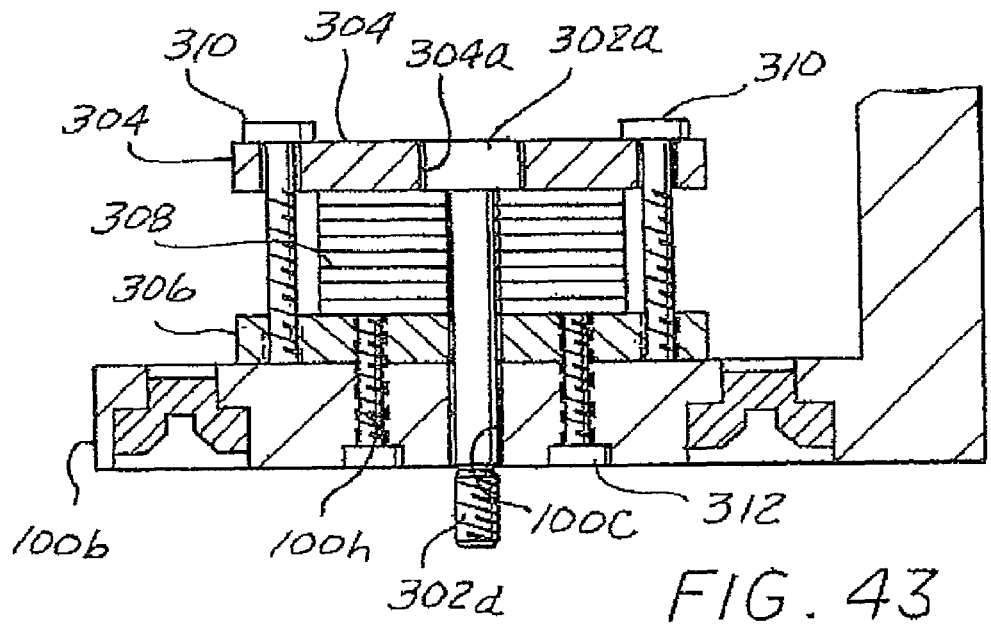

As best seen in FIGS. 41-43 an alternate method of using a pre-stressed or pre-tensioned breakaway bolt assembly 300 is described. In the example, a spring member in the form of a stack of Belleville washers 308, are positioned between upper plate 304 and lower plate 306. As best seen in FIG. 41, upper attachment bolts 310 are passed axially passed through unthreaded bores 304b and advancingly and threadingly engaged in threaded bores 306c in lower plate 306 to axially compress spring member 308 as shown. Once compressed, fastener bolt 302 is axially positioned through upper plate 302, spring member 308 and lower plate 306 with threaded portion 302d and narrowed diameter portion 302c axially extending below lower plate 306. Alternately, fastener bolt 302 may be positioned through the upper and lower plates and spring member 308 prior to advancing upper attachment bolts 310 to compress the spring member 308. In this state as best seen in FIG. 41, where spring member 308 is compressed by upper attachment bolts 310, fastener assembly 300 is are ready to be attached to, for example, a riser 100b as shown in FIG. 44 or a portion of a tooling member such as a riser arm 78a shown in FIG. 45.

Figure 35:
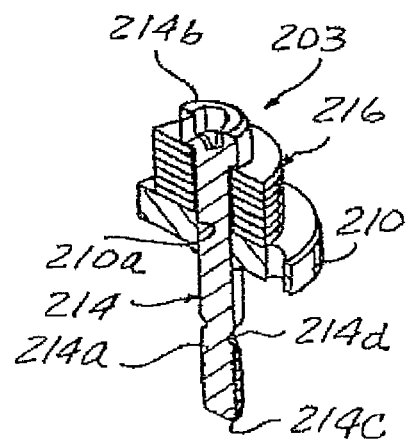
FIG. 35 is a cross-sectional view of a bolt assembly utilized in the mounting bracket of FIG. 32.
Figure 34:
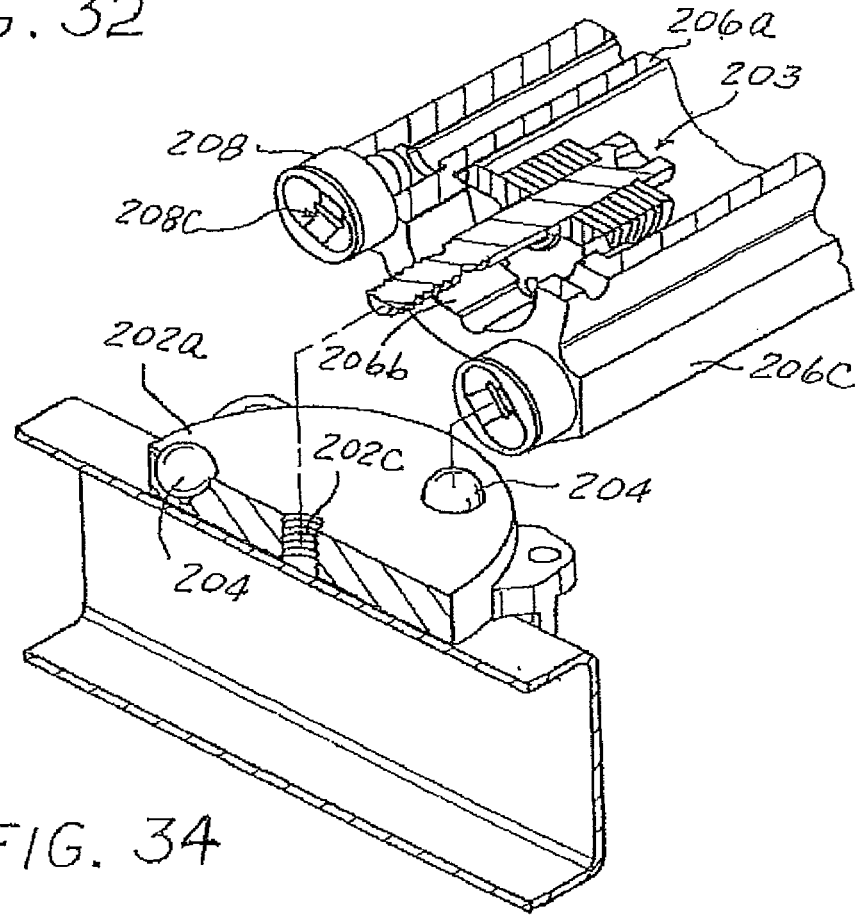
FIG. 34 is an exploded view, in cross section, of the mounting bracket of FIG. 32.
Figure 36:
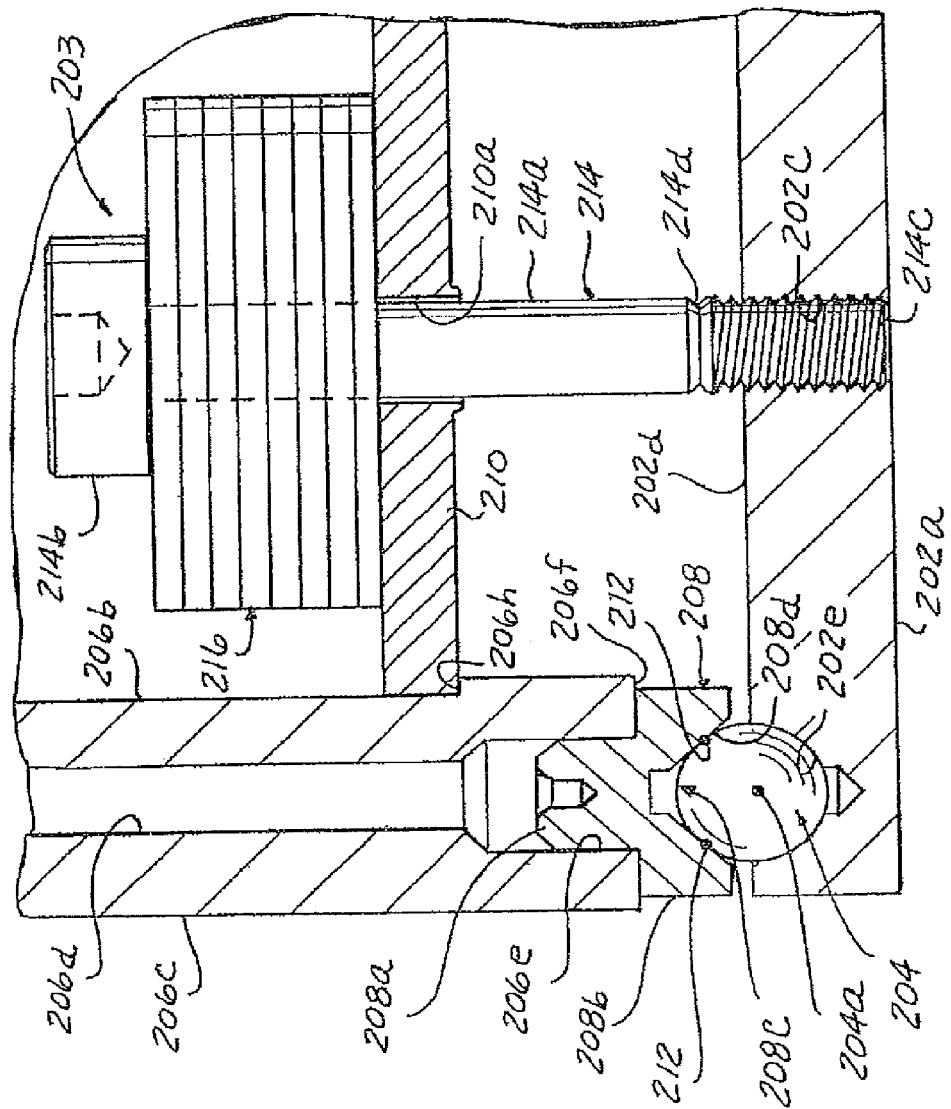
FIG. 36 is a cross-sectional view of the mounting bracket of FIG. 32.
Figure 44:
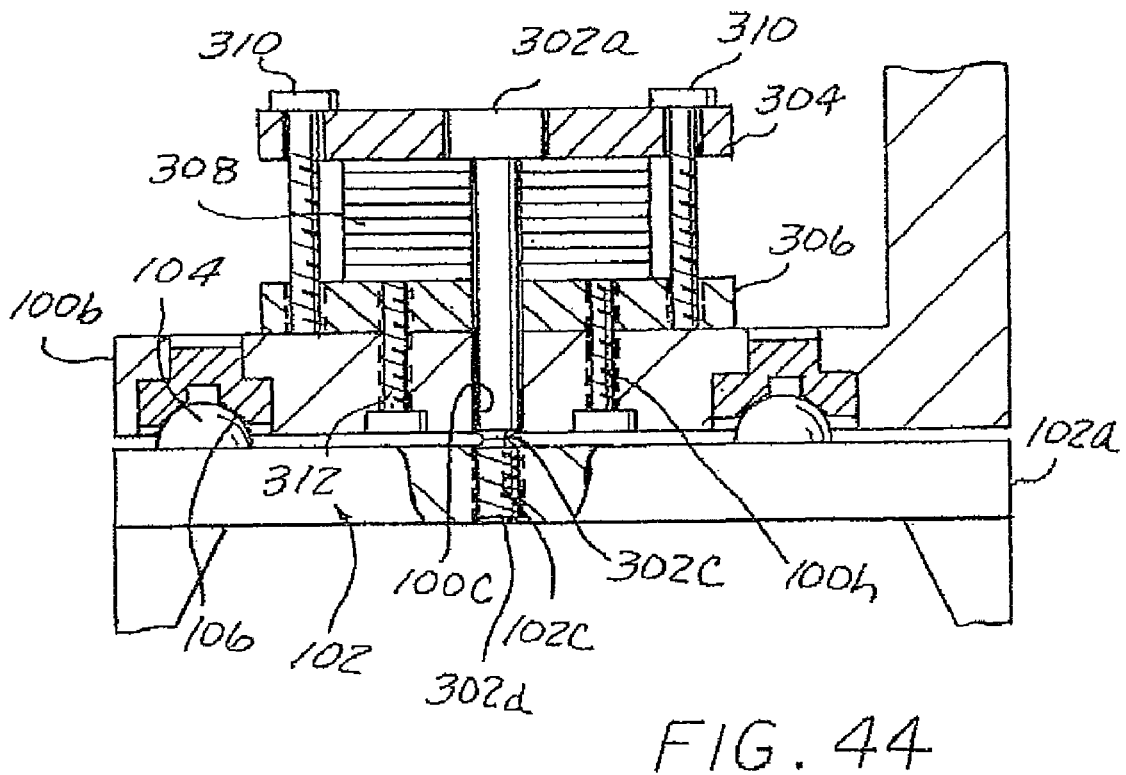

As best seen in FIGS. 43 and 44 and described above, following compression of spring member 308, fastener bolt 302 threaded portion 302d can be threadingly engaged with a riser 100b or tooling member extension arm 78a. In this example, minimal torque need be applied to fastener bolt 302 as spring member 308 is already compressed. As described above, in order to apply at least some of the pretension built up in spring member 308, upper attachment bolts 310 are removed causing the spring member, for example Belleville washers 308, to axially expand to release some of the potential energy. In a preferred example, on removal of upper attachment bolts 310, upper annular plate 304 can also be removed as there is radial space between the bolt head 302a and upper plate 304. At least a portion of the pre-tension energy of spring member 308 is transferred to fastener 302 through abutting contact of spring member 308 to the fastener head 302a thereby pre-stressing or pre-tensioning breakaway fastener 302. With the upper attachment bolts 310 and upper plate 304 removed, fastener assembly 300 takes the form of fastener assembly 203 as generally shown in FIGS. 35 and 36.

In the example shown in FIGS. 43 and 44, lower attachment bolts 312 may be used to positively attach lower plate 306 to the tooling members or framing member as described above and illustrated. On fracture of the breakaway bolt 302, the lower plate 306 remains secured to the riser 100b or other component connected thereto.

Figure 45:
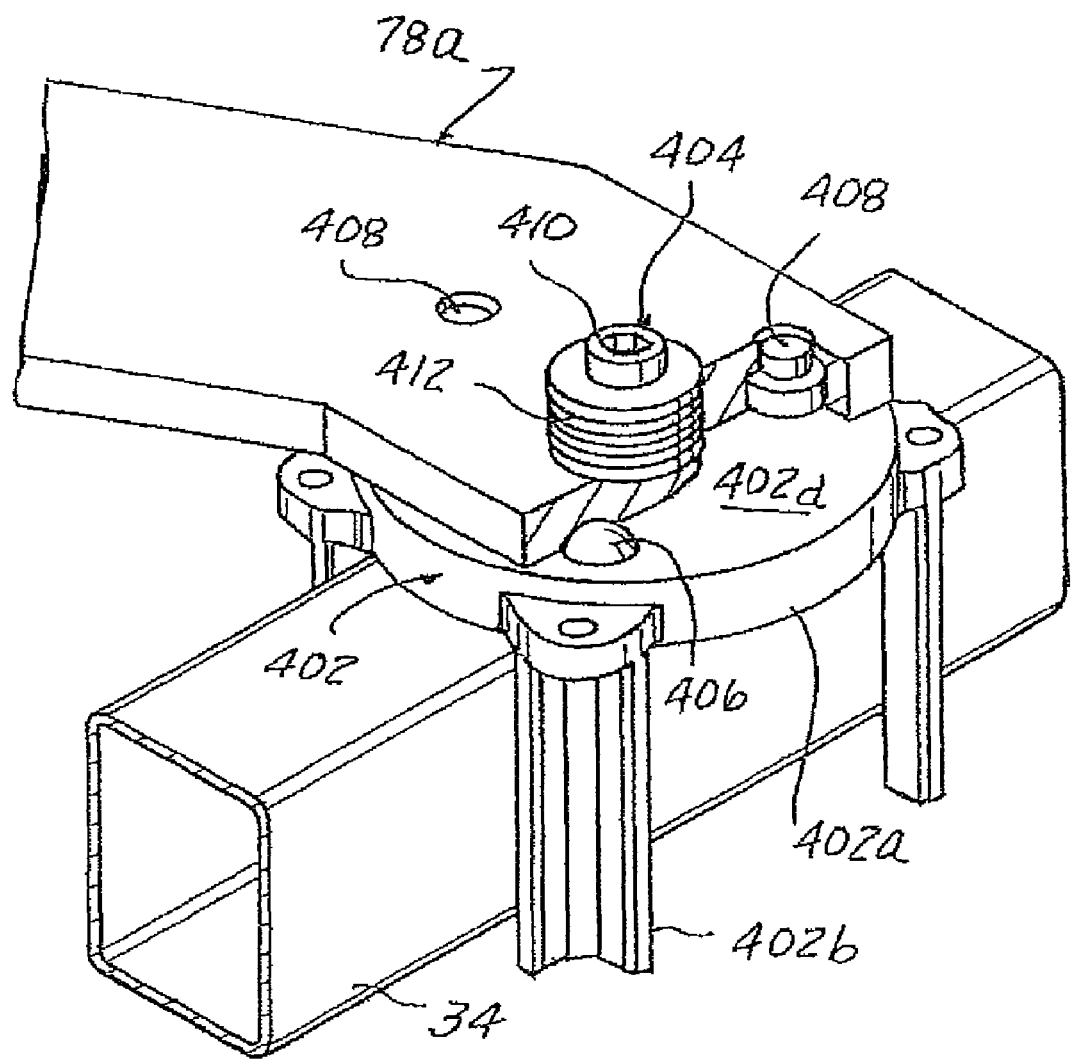
FIG. 45 is a perspective fragmentary view of a mounting bracket in which the riser is constituted by an integral extension arm of the tooling member.

In the bracket structure of FIG. 45, the riser, rather than being constituted by a discreet member, is constituted by an integral extension blade or arm of the tooling member.

The mounting bracket of FIG. 45 includes a riser arm 78a, a base 402, and a fastener assembly 404.

Riser arm 78a is constituted as an integral extension arm of a tooling member 78.

Base 402 corresponds generally to base 102 and base 202 and includes a circular platform portion 402a and a plurality of circumferentially spaced legs 402b extending integrally from the platform portion for straddling welded mounting on a skeletal member of the frame structure.

Base platform portion 402a includes a central threaded aperture (not shown) and three balls or spheres 406 are provided in the upper face 402d of the platform portion in concentric relation to the central aperture and at equal 120° spacing. Each ball is positioned in a sphere socket in the platform portion with the center of the ball positioned below the upper face 402d to preclude displacement of the ball.

Riser arm 78a mounts a plurality of equally circumferentially spaced socket pins 408 for coaction with balls 406 in the manner previously described with respect to the mounting brackets of FIGS. 24-31 and FIGS. 32-39.

Fastener assembly 404 corresponds to the fastener assembly 203 of the FIG. 32-39 mounting bracket embodiment and includes a breakaway fastener bolt 410, including a reduced diameter portion, and a stack of Belleville washers 412.

In use, the riser arm is positioned on the base with the grooves defined by the socket pins seating on the balls at a total of six defined points, whereby to positively locate and position the riser on the base, whereafter bolt 410 is tightened to threadably advance the threaded lower end of the ball into the base central aperture whereby to compress the Belleville washers 412 and place the bolt in pretension so that any significant impact against the riser arm will have the effect of shearing the bolt at the reduced diameter portion.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law. For example, although several embodiments of the mounting bracket have been described as including a specific discreet riser member, it will be understood as shown for example in the FIG. 46 embodiment, that the riser may instead be constituted by an integral extension blade or arm of the associated tooling member and the term riser or riser structure as used in the claims will be understood to include not only a discreet riser member, but also a riser formed as an integral extension arm of an associated tooling member.

What is claimed is:

1. A method of pre-tensioning a breakaway fastener assembly for use in connecting a tooling member to an assembly device, the fastener assembly including a breakaway fastener, an upper and a lower annular plate each having a thickness positioned axially apart, a compression fastener independent of the breakaway fastener and a compression spring member, the method comprising the steps of:

positioning the spring member between the upper and the lower plates;

axially positioning the compression fastener through a bore in one of the upper or lower annular plates and removeably engaging the compression fastener in the other of the upper or the lower annular plate;

axially compressing the spring member through advancing axial engagement of the compression fastener into at least a portion of the the thickness of other of the upper or the lower annular plate; and axially positioning the breakaway fastener through axially aligned bores in the upper and lower annular plates and in abutting axial engagement with the spring member removably and axially engaging the breakaway fastener with the assembly device opposite the abutting engagement with the spring member; and disengaging the compression fastener from the other of the upper or the lower annular plate thereby pre-tensioning the breakaway fastener through axial expansion of the spring member against the lower plate and the breakaway fastener before.

2. The method of claim 1 further comprising the step of selectively forming a narrowed area in a diameter of the breakaway fastener in a predetermined and localized portion of the breakaway fastener forming a stress concentration on application of a load and controlled fracture area.

3. The method of claim 2 wherein forming the narrowed area further comprises positioning the narrowed area axially distant from the adjacent lower annular plate.

4. The method of claim 3 further comprising the step of preventing the spring member from detaching from the breakaway fastener on fracture of the breakaway fastener and expansion of the spring member.

5. The method of claim 4 wherein the step of preventing detachment further comprises the step of connecting a stop to the breakaway fastener between the lower annular plate and the narrowed area preventing a remaining portion of the breakaway fastener from passing through the lower annular plate.

6. The method of claim 1 wherein prior to engaging the breakaway fastener with the assembly device, removably attaching the lower annular plate to the assembly device with a fastener.

7. The method of claim 1 wherein the step of positioning the spring member further comprises the step of axially stacking a plurality of Belleville washers one atop the other.

8. The method of claim 1 wherein the step of positioning the breakaway fastener further comprises the steps of:
   positioning the upper annular plate in radially surrounding relation to a head of the breakaway fastener; and
   positioning the lower annular plate in radially surrounding relation to a portion of a shank of the breakaway fastener.

9. A method of pre-tensioning a breakaway fastener assembly for use in connecting a tooling member to an assembly device, the fastener assembly including a breakaway fastener, an upper and a lower annular plate positioned axially apart, at least two compression fasteners independent of and positioned distant from the breakaway fastener and a spring member, the method comprising the steps of:
   positioning the spring member between the upper and the lower plates;
   axially positioning the compression fasteners through a respective bore in one of the upper or lower annular plates and threadably engaging each of the respective compression fasteners in the other of the upper and the lower annular plate;
   axially compressing the spring member through advancing axial threading engagement of the compression fasteners into the other of the upper and the lower annular plate;
   axially positioning the breakaway fastener through axially aligned bores in the upper and lower annular plates and in abutting contact with one of the spring member or upper annular plate;
   forming a discrete stress concentration controlled fracture area through a reduction of a cross-section of the breakaway fastener;
   removably and axially engaging the breakaway fastener with the assembly device adjacent the lower annular plate; and
   threadably disengaging the at least two compression fasteners from the other of the upper and lower annular plate thereby pre-tensioning the breakaway fastener through axial expansion of the spring member against the breakaway fastener.

10. The method of claim 9 further comprising the step of:
   tethering the breakaway fastener to the assembly device preventing complete separation of the breakaway fastener from the assembly device on fracture of the breakaway fastener at the controlled fracture area.

* * * * *